(12) United States Patent
Maram et al.

(10) Patent No.: US 12,375,180 B2
(45) Date of Patent: Jul. 29, 2025

(54) OPTICAL TRANSMISSION SYSTEMS, RECEIVERS, AND DEVICES, AND METHODS OF RECEIVING OPTICAL SIGNALS AND DESIGNING FILTERS AND FILTERING OPTICAL AND ELECTRICAL SIGNALS

(71) Applicant: Fonex Data Systems Inc., St-Laurent (CA)

(72) Inventors: Reza Maram, Montreal (CA); Kh Arif Shahriar, Montreal (CA); Md Samiul Alam, Montreal (CA); Pasquale Ricciardi, Beaconsfield (CA); David V. Plant, Montreal (CA)

(73) Assignee: Fonex Data Systems Inc., St-Laurent (CA)

( * ) Notice: Subject to any disclaimer, the term of this patent is extended or adjusted under 35 U.S.C. 154(b) by 266 days.

(21) Appl. No.: 18/328,928

(22) Filed: Jun. 5, 2023

(65) Prior Publication Data
US 2023/0396337 A1 Dec. 7, 2023

Related U.S. Application Data

(60) Provisional application No. 63/490,106, filed on Mar. 14, 2023, provisional application No. 63/349,132, filed on Jun. 5, 2022.

(51) Int. Cl.
*H04B 10/04* (2006.01)
*H04B 10/50* (2013.01)
*H04B 10/54* (2013.01)

(52) U.S. Cl.
CPC ......... *H04B 10/504* (2013.01); *H04B 10/541* (2013.01)

(58) Field of Classification Search
CPC .. H04B 10/504; H04B 10/541; H04B 10/516; H04B 10/40; H04B 10/2507;
(Continued)

(56) References Cited

U.S. PATENT DOCUMENTS 6,490,069 B1 * 12/2002 Kahn ................ H04B 10/505
398/186
8,401,397 B2   3/2013 Takahashi
(Continued)

OTHER PUBLICATIONS

PCTCA2023050766_ISR_Jul. 11, 2023.
PCTCA2023050766_WO_Jul. 11, 2023.

*Primary Examiner* — Hanh Phan
(74) *Attorney, Agent, or Firm* — Nemphos Braue LLC; Michael Antone

(57) ABSTRACT

Systems may include one or more directly modulated laser ("DML") optical transmitters to transmit optical signals carrying data to one or more optical receivers and include one or more filters designed to reduce the power in lower modulation levels. In various embodiments, the optical receiver includes an optical combiner to combine local oscillator light at a frequency, fLO with the optical data signal, an optical-electrical converter to downconvert the combined LO-optical signal to an electrical signal including four PAM4 frequencies, an electrical filter to attenuate the electrical power in the PAM4 frequencies by differing amounts, rectify and output the electrical signal. Systems may include extinction ratio management and thermal chirp compensation, and may include optical filters designed for chirp management with different laser parameters ($\alpha$ and k) and OMAs with PAM-M format in both optical and electrical domains and for use with quasi-coherent receivers (QCR) and DML transmitters.

20 Claims, 30 Drawing Sheets

(58) Field of Classification Search
CPC ............ H04B 10/6971; H04B 10/6972; H04B 10/6973; H04B 10/60; H04B 10/64; H04B 10/616; H04B 10/6164; H04B 10/6163; H04B 10/6165
USPC ....... 398/182, 183, 186, 188, 189, 135, 136, 398/158, 159, 33, 38, 25, 26, 27, 202, 398/203, 204, 205, 207, 208, 209, 214
See application file for complete search history.

(56) References Cited

U.S. PATENT DOCUMENTS

| | | | |
|---|---|---|---|
| 9,020,346 B2 * | 4/2015 | Bhoja | H04B 14/023 398/43 |
| 10,256,934 B2 | 4/2019 | Yu et al. | |
| 10,367,588 B2 | 7/2019 | Jensen et al. | |
| 10,419,123 B2 | 9/2019 | Menezo | |
| 2003/0180041 A1 * | 9/2003 | Azadet | H04L 25/067 398/189 |

* cited by examiner

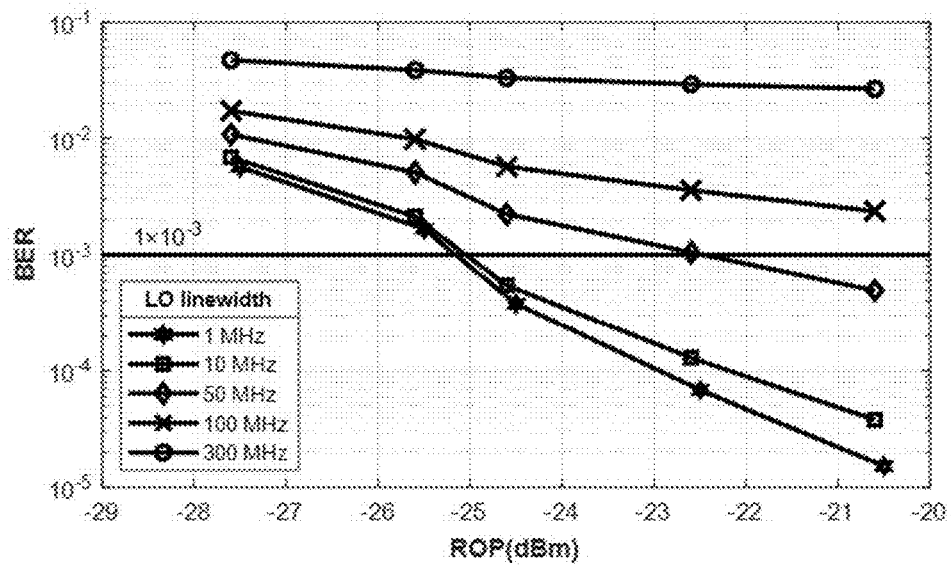
FIG. 7C
FIG. 7D
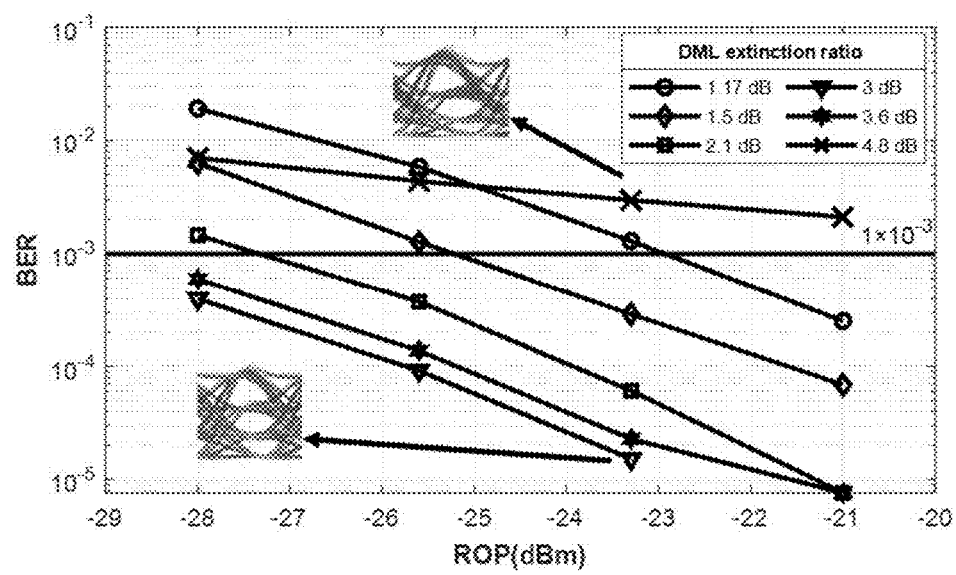

FIG. 8A
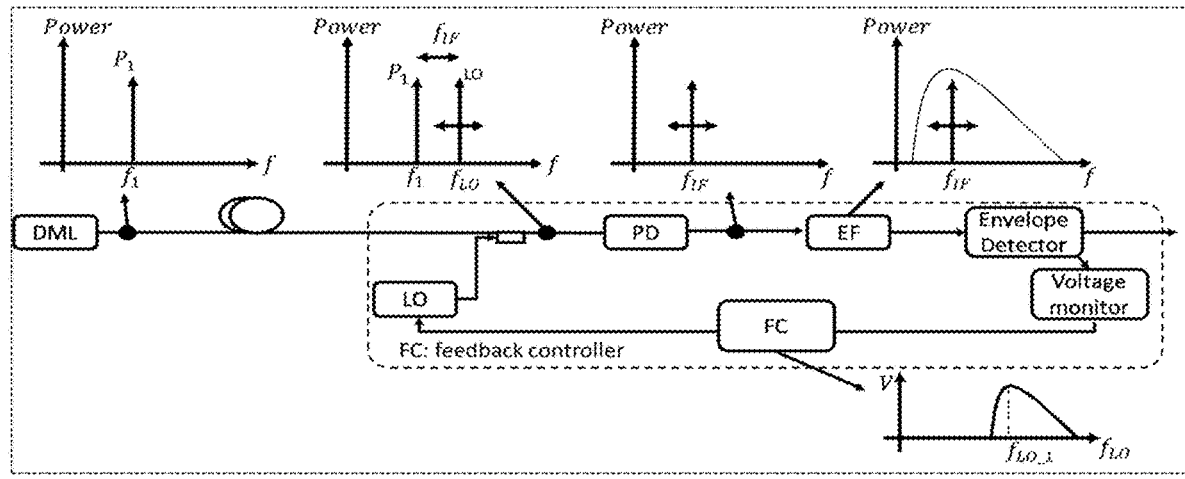
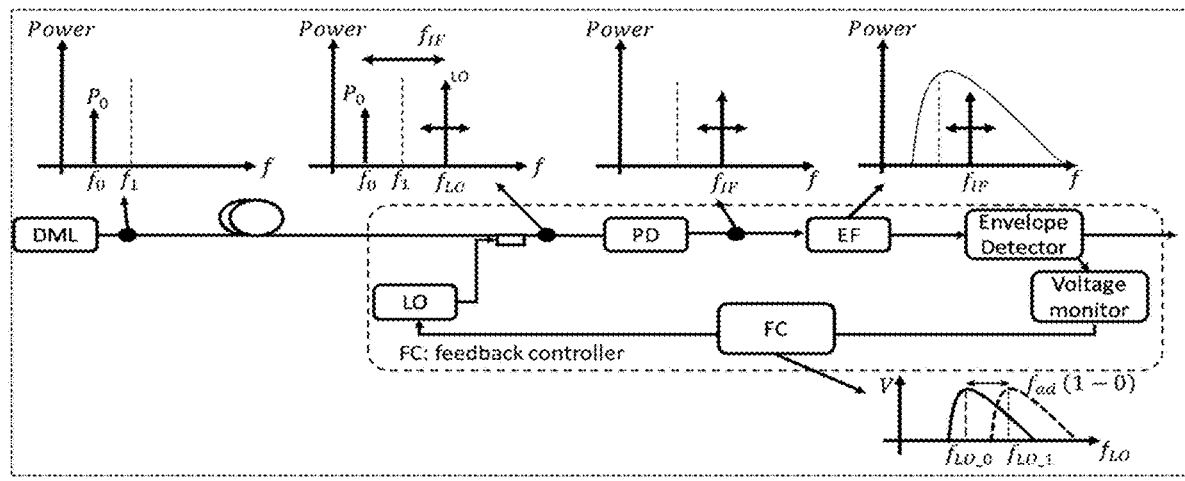
FIG. 8B

DML = Directly Modulated Laser
QCR = Quasi-coherent Receiver
LPF = Low-pass Filter
FB = Feedback
a = Gain/attenuation coefficient
MA = Main Amplifier
C/S = Coupler/Splitter
TC = Thermal Chirp FIG. 11A
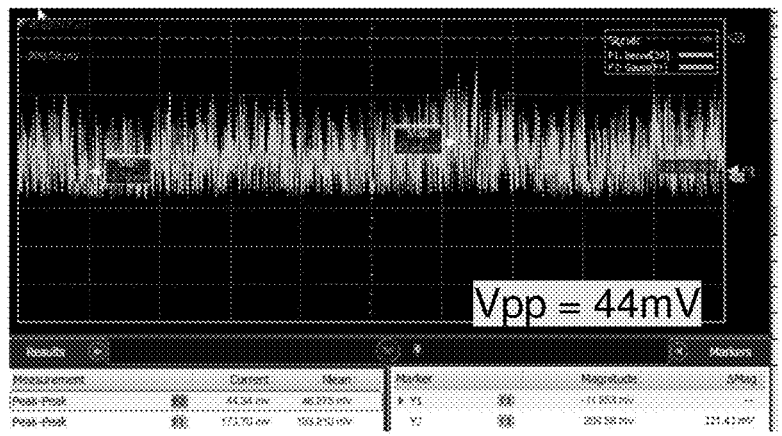
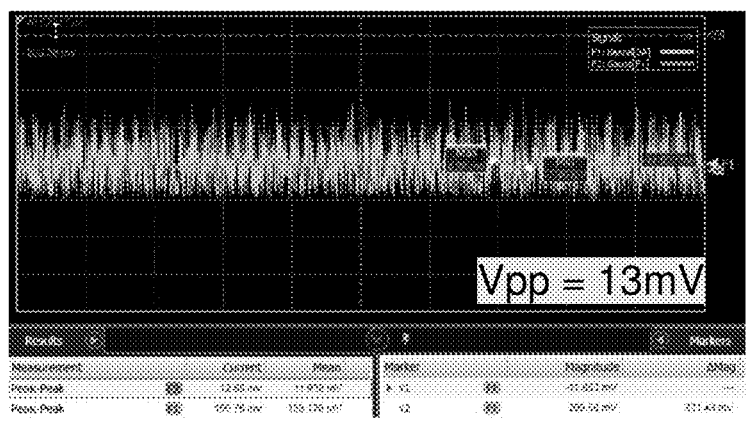
FIG. 11B
FIG. 11C
Before thermal compensation
After thermal compensation
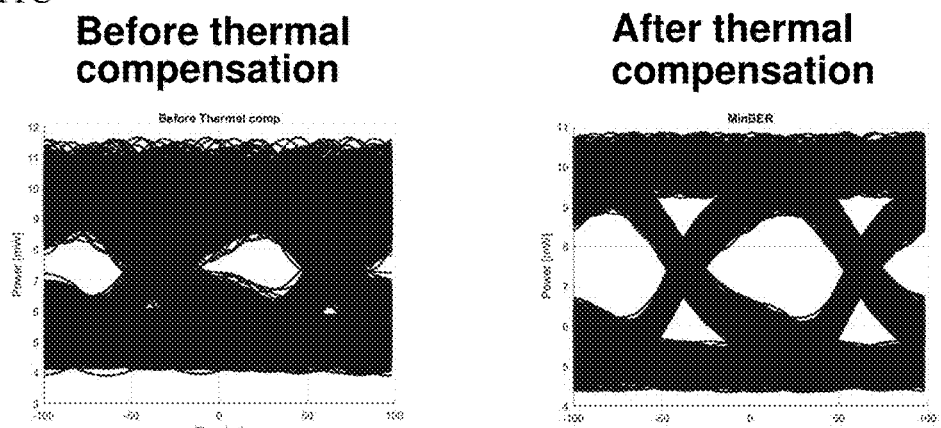
FIG. 11D
BER=7.23e-09         BER=2.54e-12

FIG. 12

Determine the $OMA_{DML}$ and $Pavg_{DML}$ for a DML based on bit rate, distance and modulation format

↓

Calculate $E_{DML}(t) = A_{DML}(t)\, e^{i\varphi_{DML}(t)}$
$E_{DML}(t) \leftrightarrow E_{DML}(f)$

↓

Set two of the following three parameters for the CML output, $OMA_{CML}$, $Pavg_{CML}$, and $ER_{CML}$

↓

Calculate $E_{CML}(t) = A_{CML}(t)\, e^{i\varphi_{CML}(t)}$
$E_{CML}(t) \leftrightarrow E_{CML}(f)$

↓

Filter transfer function
$H(f) = E_{CML}(f)/E_{DML}(f)$

↓

Identify filter shape that fits the transfer function

↓

Apply filter using filter shape to at least one of the DML input or output

FIG. 26
(a) Optical Filter as a part of Tx
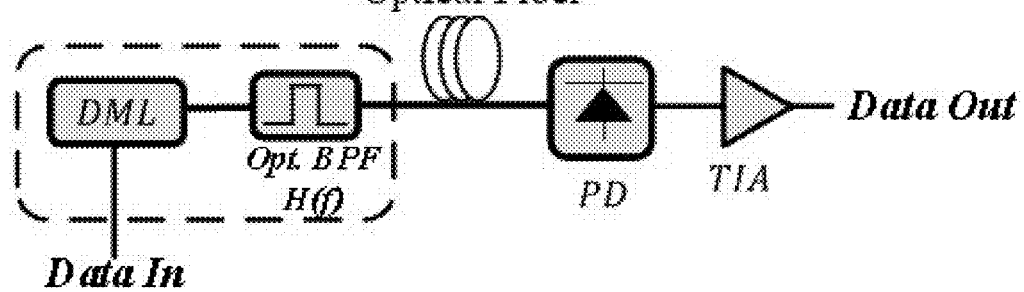
(b) Optical Filter as a part of Rx
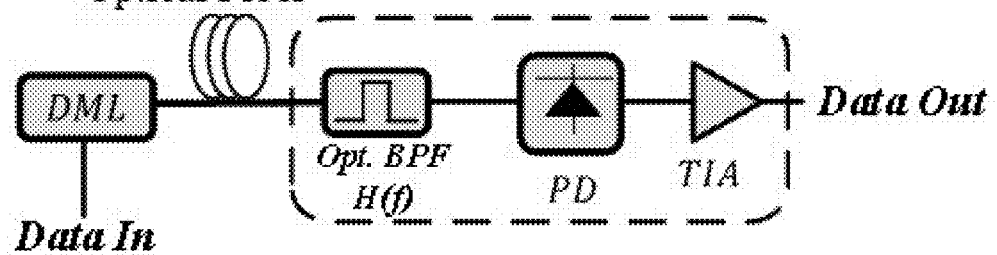
(c) Optical Filter as part of Tx and Rx
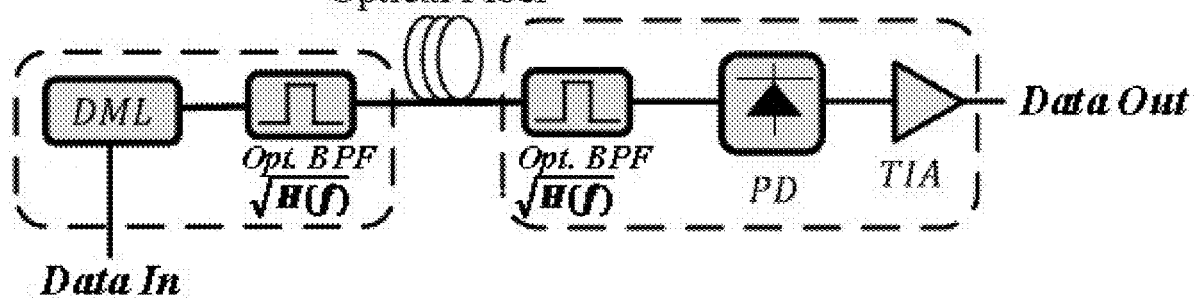

OPTICAL TRANSMISSION SYSTEMS, RECEIVERS, AND DEVICES, AND METHODS OF RECEIVING OPTICAL SIGNALS AND DESIGNING FILTERS AND FILTERING OPTICAL AND ELECTRICAL SIGNALS

CROSS-REFERENCE TO RELATED APPLICATIONS

This application claims priority to and the benefit of U.S. Provisional Patent Application No. 63/349,132 filed on Jun. 5, 2022 and U.S. Provisional Patent Application No. 63/490,106 filed on Mar. 14, 2023, the disclosure of each is incorporated by reference in its entireties.

STATEMENT REGARDING FEDERALLY SPONSORED RESEARCH OR DEVELOPMENT (Not Applicable)

BACKGROUND OF THE INVENTION

Field of the Invention

The present invention generally relates to communication systems. More specifically, the invention relates to improved optical transmission systems, receivers, filters, and methods of transmission, reception, filtering, and designing filters.

Background

There is a seemingly ever-increasing demand for more capacity and high transmission speeds from communication networks to support the exponential growth in services being provided over these networks. The ability to expand the reach and information carrying capacity of these communication systems is directly related to the cost of the system. The continued expansion of the reach and capacity enables the delivery of additional services over the network, which, in turn, drives additional expansion. In order to increase the information transmission rates in these systems, it is necessary to overcome a wide variety of transmission impairments, such as interference within and between information channels in the system, and to address the cost associated with the technical solutions.

For example, the communications industry has quickly moved from 10G to 100G services through the parallelization of 10G and 25G Non-Return-to-Zero ("NRZ") transmission technologies. As the industry now looks to increase capacity by evolving to 400G speeds, there is a general recognition that more advanced technologies must be adopted to enable this evolution. One such technology advance is the evolution from NRZ transmission to transmission using Pulse Amplitude Modulation 4 ("PAM4") modulation, which can effectively double the throughput of a system relative to NRZ transmission.

The transition to PAM4 modulation introduces numerous technical challenges that must be overcome to enable a cost-effective transmission of signals over distances useful in the communication network. As such, there is a continuing need for solutions to the technical and supply chain challenges involved in implementing PAM4 and other advanced modulation technologies in communications systems. This need is particularly acute in metro and access networks, where the deployment of high cost, high performance systems is not financially feasible.

BRIEF SUMMARY OF THE INVENTION

The present invention addresses the above noted needs by providing communication systems, devices, and methods that enable lower cost, higher performance systems through the use of receivers that compensate for optical transmission impairments.

In various embodiments, the system may include one or more directly modulated laser ("DML") optical transmitters ("OTx") in communication to transmit optical signals carrying data in a PAM4 modulation format to one or more optical receivers ("ORx") embodied as a quasi-coherent receiver ("QCR"). The QCR is configured to combine the incoming optical signal with light from a local oscillator ("LO") and separate the combined LO-optical signal into two combined LO-optical signals having orthogonal polarizations that are downconverted to an intermediate RF frequency in separate photodiodes to produce two RF signal carrying the data in PAM4 modulation format including electrical power in four PAM4 frequencies proximate the intermediate frequency. The two RF signals are then electrically filtered using one or more electrical filters, such that the electrical power in at least one, and often each, of the PAM4 frequencies is attenuated by a differing amount by the electrical filter. The filtered electrical signals are provided to respective envelope detectors, which may be implemented as squaring circuits, and may be passed through another filter, then combined, and output as an output electrical signal carrying the data. By filtering the RF signals in a QCR, the negative impact of non-linear distortions and chromatic dispersion can be significantly reduced enabling improved transmission performance using DML transmitters.

In various embodiments, the extinction ratio ("ER") of the DML OTx in a link may be adjusted upon installation, periodically, or continuously depending upon the system configuration to improve the bit error rate ("BER") performance of optical signals being transmitted through the link. The optimal ER for a DML transmitter in a given link may vary depending upon various link parameters, such as laser characteristics, transmission distance, the optical fiber, receiver characteristics, etc. In some applications, the optimal ER setting for a link may not be the maximum achievable ER for the DML OTx.

In various embodiments, the system may be configured at the OTx or ORx to compensate for thermal chirp in the OTx by applying a slow modulation to the received signal. The compensation applied to the received signal may be controlled using various feedback and feed forward loop to improve the receiver performance based on the received signal or the signal being transmitted.

In various embodiments, filters may be designed for chirp management with different laser parameters ($\alpha$ and $\kappa$) and OMAs with PAM-M format. The methods provide for the identification of filter profiles based on the DML output spectrum to enable transmission over longer fiber propagation distances. The principle is applicable to both optical and electrical domain and allows one to design a RF filter required for quasi-coherent receiver (QCR) with a DML as the transmitter. One or more optical filters providing the desired filter profile, along with the electrical filters, in the aggregate may be placed in one or more locations in the optical circuit from the output of the DML to the input of the photodiode.

Accordingly, the present disclosure addresses the continuing need for systems, devices, and methods with improved cost and performance.

BRIEF DESCRIPTION OF THE DRAWINGS

The accompanying drawings are included for the purpose of exemplary illustration of various aspects of the present invention, and not for purposes of limiting the invention, wherein:

FIGS. 8A-8B depict exemplary extinction ratio control algorithms.

FIGS. 11A-11D show thermal chirp compensation simulation results.

FIG. 12 depicts exemplary filter design and identification methods of the present invention.

FIG. 26 illustrates exemplary components of devices and platforms for use in the present invention.

Figure 1:
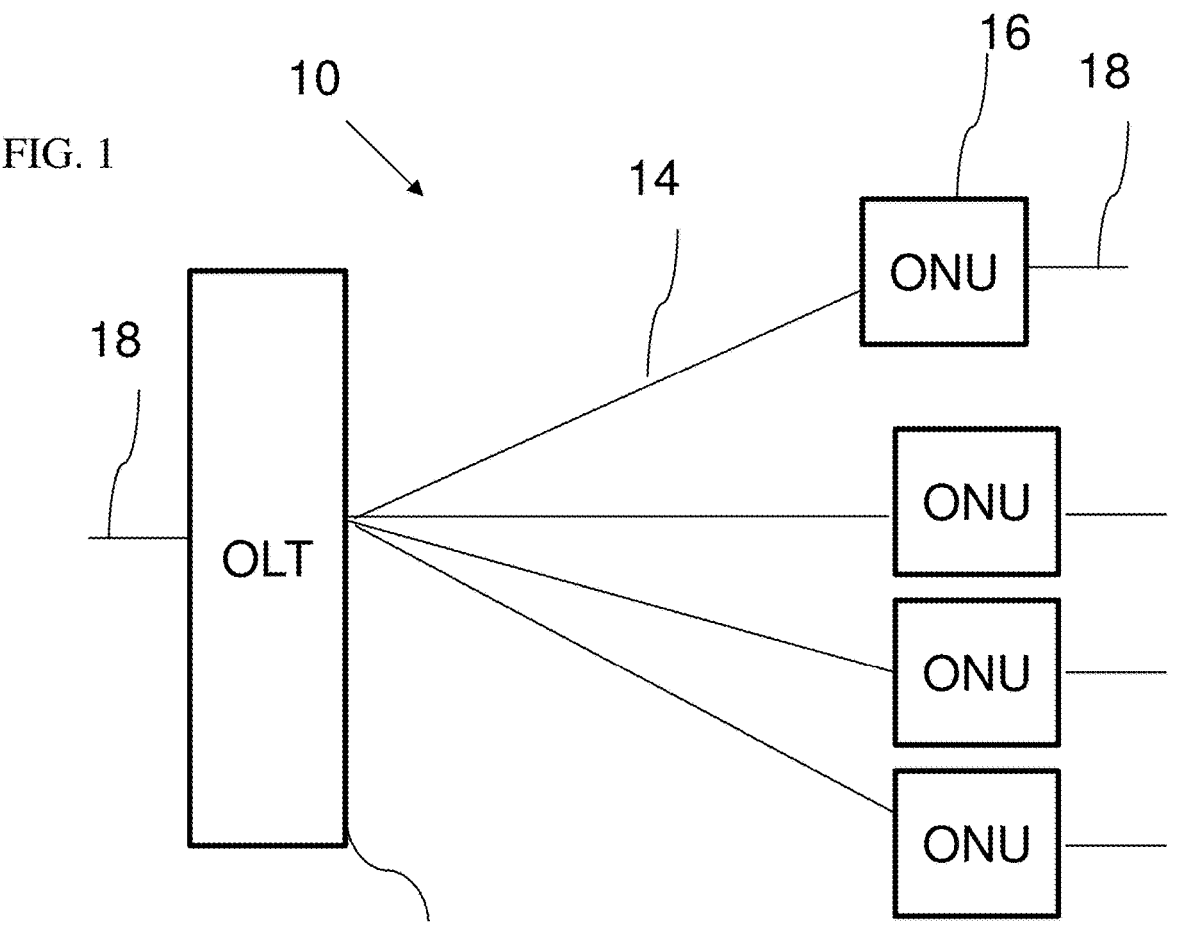
FIGS. 1-3 show exemplary optical system embodiments.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Optical systems 10 of the present invention may be employed in various known configurations in uni- or bi-directional systems that may be point or multi-point to point or multi-point configurations with nodes deployed in linear, ring, mesh, and other network topologies and may communicate with a network management system. In general, the system 10 may be deployed using free space and/or optical fiber, but it may be appreciated that many of the applications may involve fiber optic-based systems.

Figure 2:
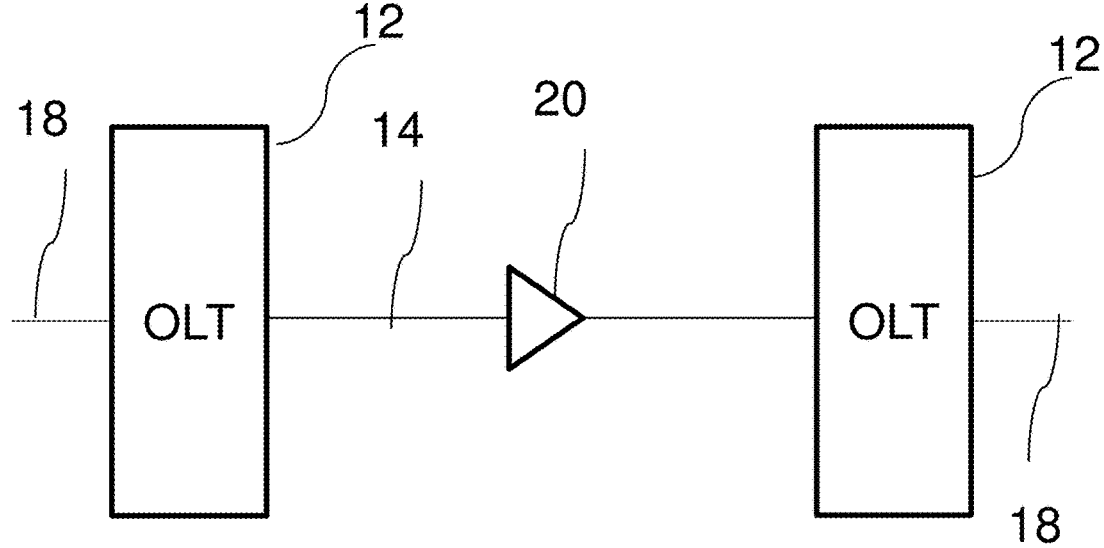

FIGS. 1 & 2 depict exemplary embodiments of optical system 10 in point to multi-point links (1) and point to point links (2) between nodes. The links may be stand-alone optical communication links or may be part of a larger network as described in the preceding paragraph in which nodes 11 may include optical line terminals or regenerators, optical network units, optical switches, add/drop multiplexers (OADM), optical amplifiers (OA), etc. in various physical and management network architectures, such as in FIG. 3.

In FIG. 1, exemplary optical system 10 embodiments may include an optical line terminal or regenerator (OLT) 12. The OLT 12 may be in uni- or bi-directional optical communication via one or more optical fibers 14 with one or more optical network units (ONU) 16. The OLTs 12 and ONUs 16 may be connected to one or more input/output lines 18, which may be optical and/or electrical depending upon the network implementation.

Figure 3:
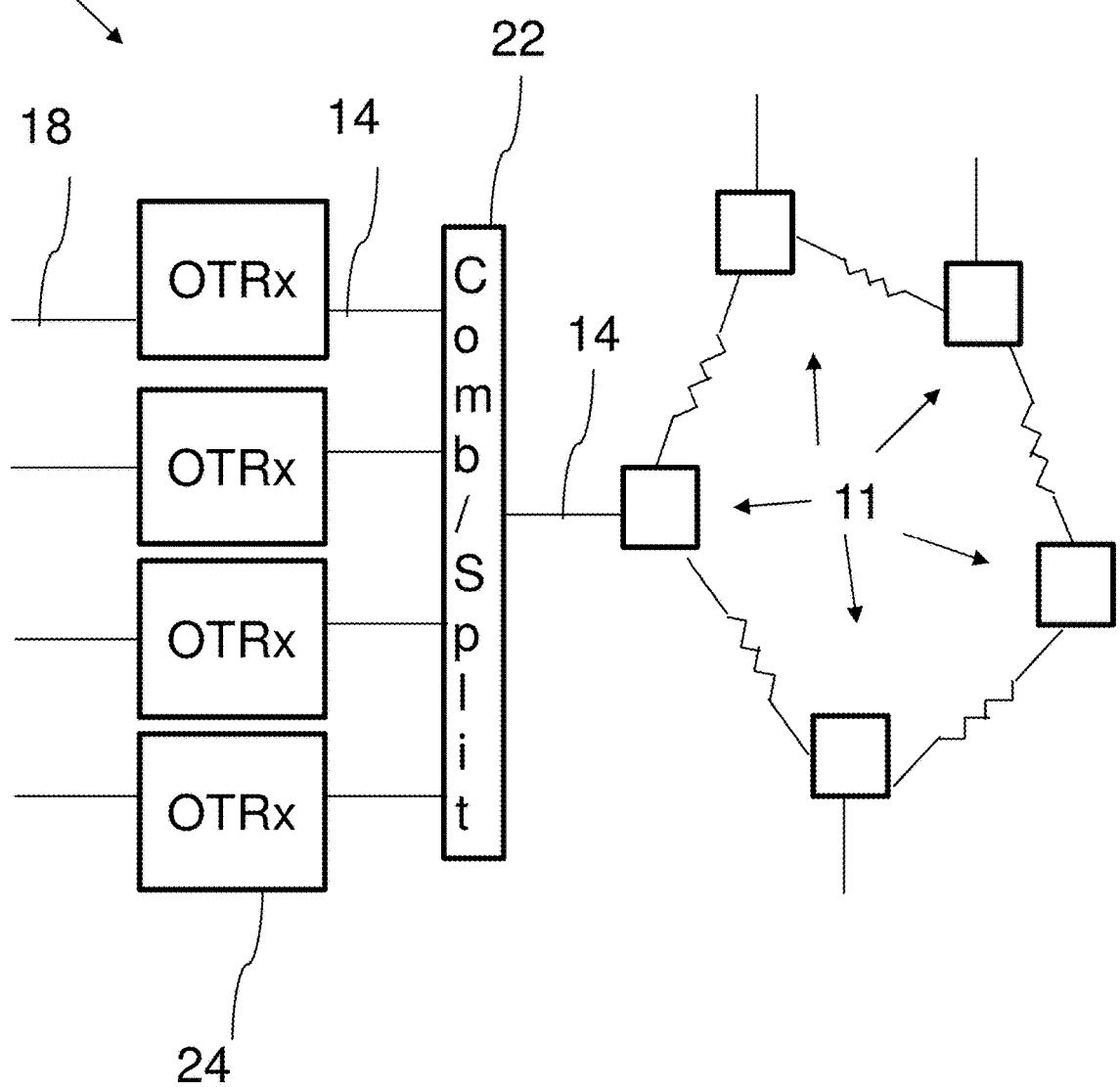

FIG. 2 shows exemplary optical system 10 embodiments including a point to point link between two OLTs 12. FIGS. 1-3 embodiments may or may not include optical amplifiers 20 depending upon the network configuration.

FIGS. 1-3 embodiments may be deployed in various layers in the network including the metro and access layers of the network. In the access networks, including mobile radio access networks (RAN) fronthaul, midhaul, and backhaul and aggregation, the system 10 may be operated as passive optical network ("PON") or may include line amplifiers 20 to provide amplification between the nodes and/or the nodes may include lumped and distributed amplifiers, such as Erbium and Raman amplifiers.

FIG. 3 shows exemplary OLT 12 and ONU 16 node embodiments that may include an optical combiner/splitter 22 that may combine and/or split optical signals when more than one transmitter or receiver, (OTRx) 24 is used in the system 10.

The optical combiner/splitter 22 may include passive combiners and wavelength specific multiplexers and demultiplexers depending upon whether the optical system is deployed as a single wavelength and/or wavelength division multiplexed system. For example, the optical system 10 may be deployed as a time division multiplexed ("TDM"), wavelength division multiplexed ("WDM"), or time & wavelength division multiplexed ("TWDM") system in which each ONU 16 communicating with the OLT 12 may use the same or different wavelengths as will be further described herein. It will be appreciated that if a node in the system is only transmitting and/or receiving one channel and only one channel is present on the fiber link 14 connecting the nodes, then optical combiner/splitter 22 may be used in the nodes.

The optical transmitter or receiver (OTRx) 24 may include only optical transmitters (OTx) 28 or optical receivers (ORx) 30 as separate transmitters and receivers, or optical transceivers depending up the system configuration. In various embodiments, it may be cost effective to employ integrated optical transceivers to reduce cost, but in other embodiments it may be more desirable to employ separate optical transmitters and receivers, as well as to merely provide for uni-directional communication.

Figure 4:
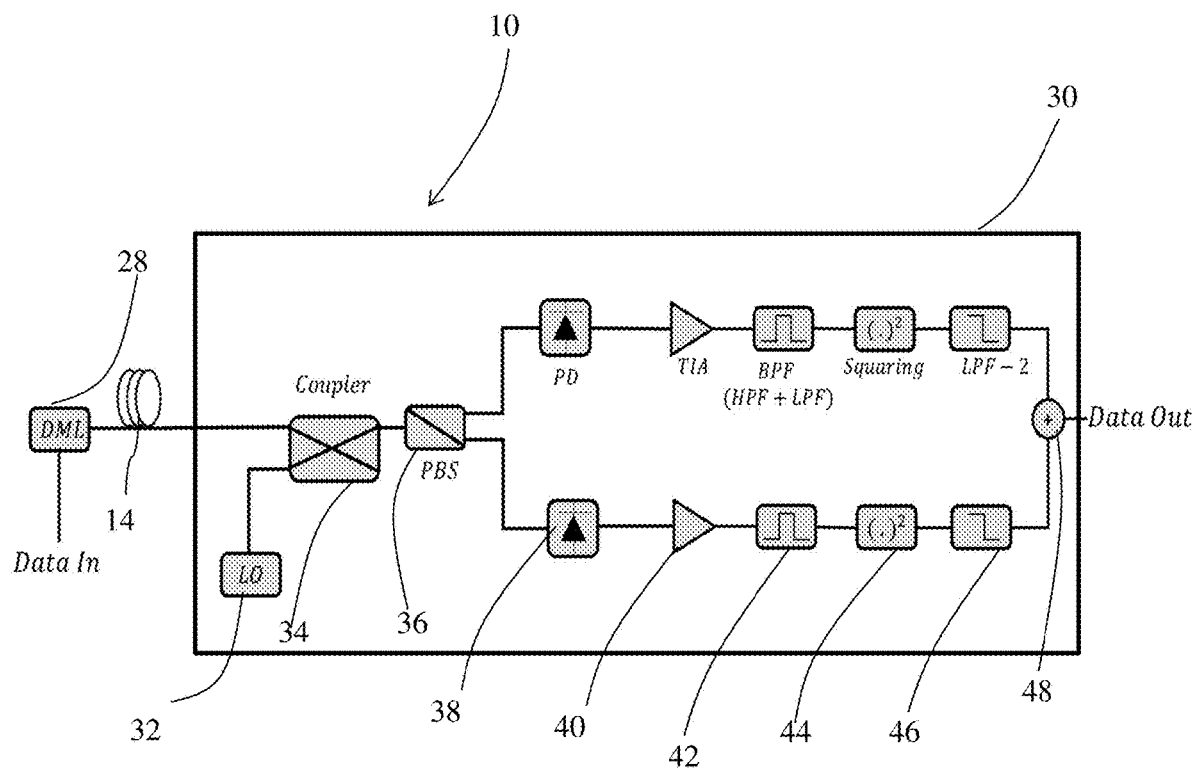
FIG. 4 depicts exemplary optical system embodiments.

FIG. 4 depicts exemplary optical system embodiments in which the optical transmitter 28 is embodied as a directly modulated laser (DML) transmitter and the ORx 30 is embodied as a quasi-coherent receiver (QCR). The DML transmitter may be configured to receive input data and modulate the data onto the optical signal in a PAM4 modulation format, which generates an optical signal including optical power at four PAM4 frequencies proximate an optical signal center frequency of the laser corresponding to the four PAM4 voltage levels, Level 0, Level 1, Level 2, and Level 3, via frequency modulation of the signal induced by directly modulating the laser.

In FIG. 4 embodiments, the ORx 30 may be implemented in various polarization diversity configurations. For example, the QCR may implemented using configuration such as those described in U.S. patent Ser. No. 10/367,588, 10014952, and 11070294, the disclosures of which are incorporated herein by reference.

Figure 5:
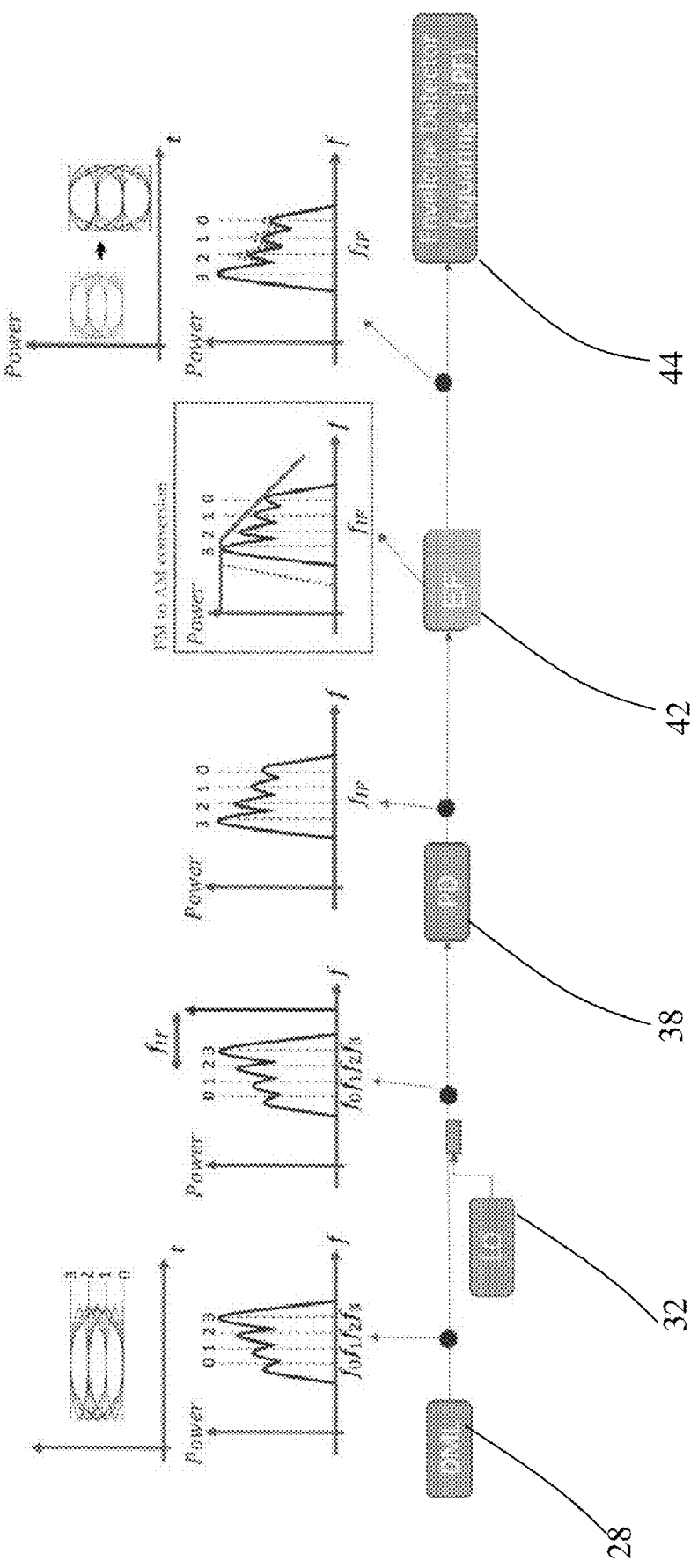
FIG. 5 depicts exemplary optical and electrical signal characteristics at various points in the system.

As shown in FIG. 4, the ORx 30 generally may include one or more fixed wavelength or wavelength tunable local oscillator ("LO") optical sources 32, such as lasers of various optical powers and various linewidths, to provide LO light at one or more LO center frequencies, which may offset from the center frequency of the optical signal, i.e., the LO frequency offset. The LO 32 emitting light at a local oscillator optical frequency ($f_{LO}$) which is offset from the optical signal center frequency ($f_C$) by frequency-offset, or frequency difference, ($dF=f_{IF}$ as shown in FIG. 5), which may also be referred to as the intermediate frequency, IF. The frequency difference dF is the resulting center frequency of the RF electrical signal that has been downconverted from the optical signal.

In various embodiments, the LO(s) 32 may be a cooled or uncooled laser, such as a VCSEL, DFB, DBR, ECL or other type of laser. The LO 32 may be tuned to a frequency or a wavelength of the signal. This can either be an in-band or an out-of-band configuration. In an in-band configuration, the LO 32 is tuned to a frequency or wavelength within a spectrum of the signal. In an out-of-band configuration, the LO 32 is tuned to a frequency or wavelength outside a spectrum of the signal. In this way, wavelength selectivity may be achieved using the LO 32. Using the LO 32 as a wavelength selector enables the system to operate with or without optical filters.

The incoming optical signal and LO 32 light may be combined and split into orthogonally polarized combined signals using separate combiners 34 and splitters 36 in the receiver 30 as shown in FIG. 4. Alternatively, the combiner 34 and splitter 36 may be an integrated device, such as those described in PCT Pub. No. WO2020208581, the disclosure of which is incorporated herein by reference.

The orthogonally-polarized combined signals exiting the splitter 36 are provided to two optical-to-electrical ("OE") converters 38, e.g., photodiodes (PD), to convert input combined LO-optical signal to a corresponding RF signal carrying the data at the intermediate RF frequency.

As shown in FIG. 5, the optical signal output from the DML transmitter 28 will generally include optical power in four PAM4 frequencies, $f_0$, $f_1$, $f_2$, $f_3$, which correspond to the four PAM4 voltage levels, Level 0, Level 1, Level 2, and Level 3 that results from the frequency modulation induced by directly modulating the laser and a finite extinction ratio (ER). As such, the downconverted signal from the OE converters 38 will include two RF signals centered at the intermediate frequency carrying the data in the four PAM4 frequencies proximate the intermediate frequency.

The RF signal output from the OE converter may pass through an amplifier 40, e.g., a transimpedance amplifier ("TIA") to increase or set the signal power to a desired level. The amplified signals are then provided to an electrical filter 42 that is configured such that the electrical power in each of the PAM4 frequencies is reduced by a differing amount as shown in FIG. 5. In various embodiments in which the combined LO-optical signal is not split, but received using one OE converter 38, it may be desirable to include a high pass filter in the electrical filter 42 to filter out lowering frequency signals.

The filtered intermediate frequency signal may be provided to a rectifier 44, then may be filtered again following rectification before the two filtered intermediate frequency signals are combined in an electrical combiner 48 and an electrical signal output carrying the data.

One of skill in the art will appreciate that the electrical filter 42 may be designed with various shapes to attenuate, i.e., reduce, the power in at least one, and often each, of the various PAM4 frequencies by different amounts to achieve various design objectives. For example, as shown in FIG. 5, the electrical filter 42 may be designed so that the percentage-wise reduction in the power in the Level 0 frequency is more than in Level 1, which is more than Level 2, which is more than Level 3. In other words, a percent power reduction of Level 0>Level 1>Level 2>Level 3 as shown in FIG. 5.

Figure 6A:
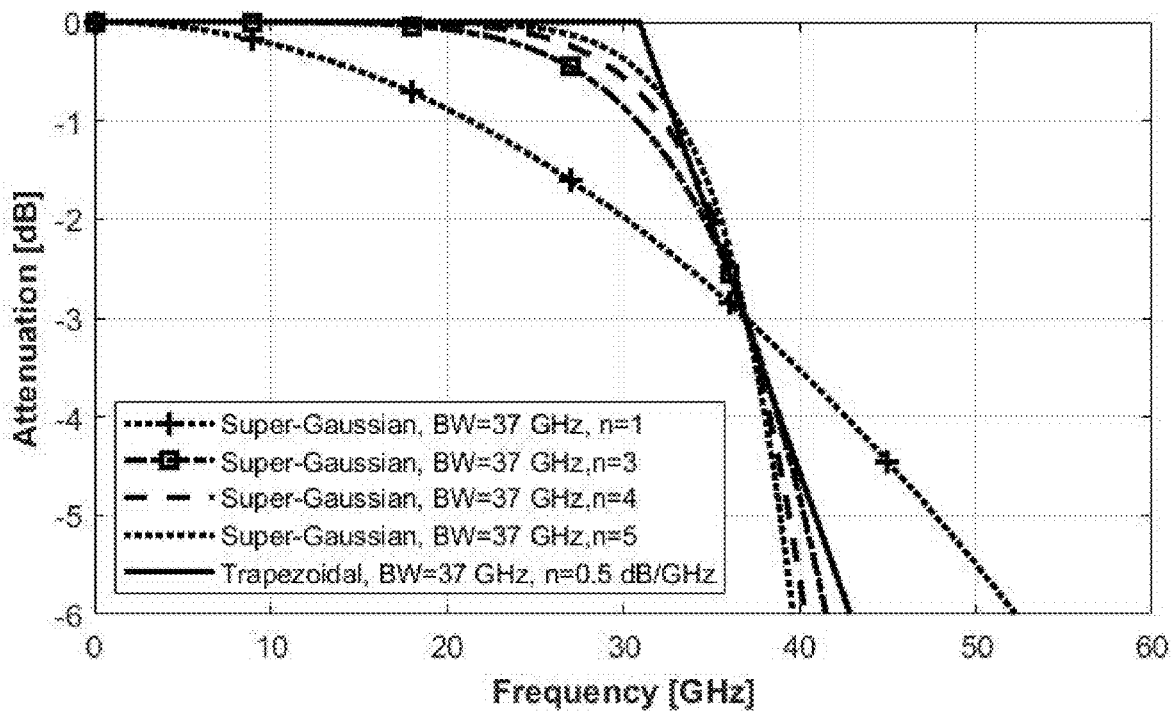
FIGS. 6A-7G show results of simulations implementing the present invention.

In various embodiments, the electrical filter 42 may be design with a linear or near linear edge, which may simplify the positioning or tuning of the signals to the filter relative to more complicated filter shapes. A tunable or fixed filter may be employed, and the filtering of each of the PAM4 frequencies, $f_0$, $f_1$, $f_2$, $f_3$, may be managed by adjusting the frequency of the LO, $f_{LO}$, which adjusts the intermediate frequency, $f_{IF}$. Various filter shapes may be employed that provide smoothly varying linear or curved shapes, such as trapezoidal, Gaussian, Super gaussian, Bessel or Butterworth filters, such as shown in FIG. 6A.

In addition to the filter shape, the attenuation of the electrical filter 42 is important. For example, it may be desirable to design the filter, so that the electrical filter 42 attenuates the power in the PAM4 frequencies, $f_0$, $f_1$, $f_2$, $f_3$, in a manner to provide equal eye openings for the PAM4 signal. Significant attenuation of PAM4 frequencies may result in a reduction in the eye openings and/or asymmetry in the eye diagram which may degrade the overall BER. Significant attenuation may also result in a lower signal swing into the rectifier, which would lower the signal-to-noise ratio (SNR) of the signal.

Figure 6B:
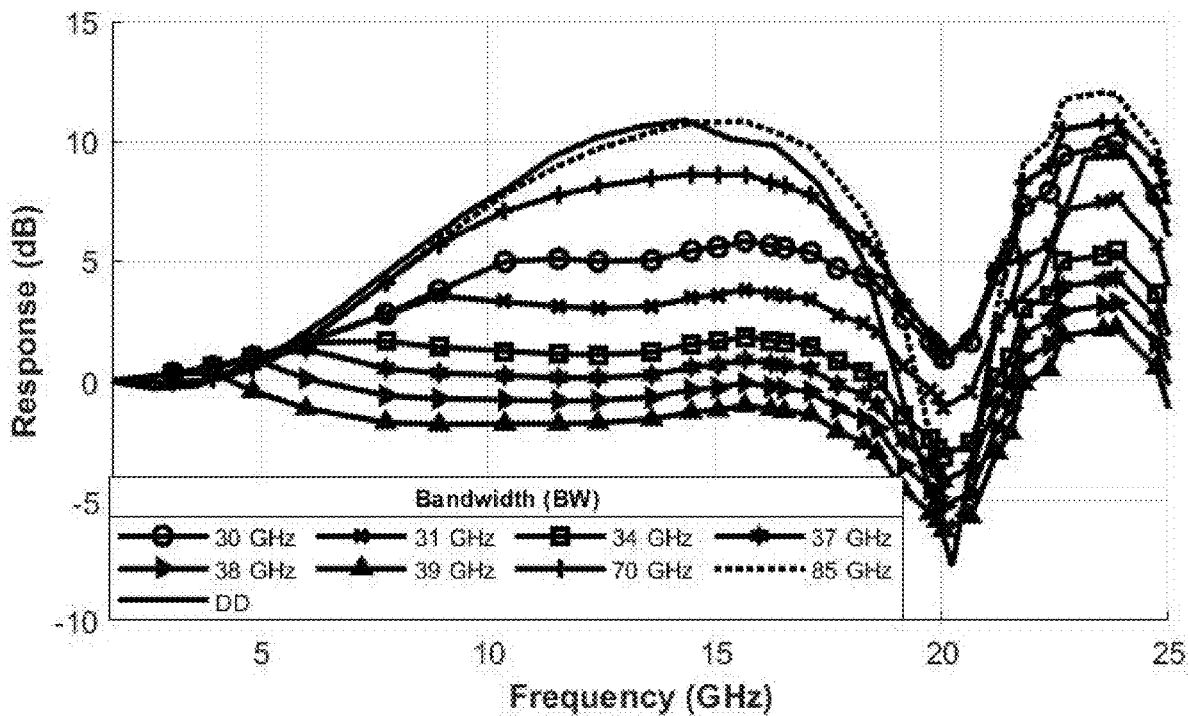

FIG. 6B shows the variation in system performance as a function of the electrical filter 42 bandwidth for a trapezoidal shaped filter in a simulated 25 Gbps PAM4 20 km SMF fiber system with a low pass filter ("LPF") modeled as a trapezoidal filter of slope 0.5 dB/GHz and the magnitude response of the system was calculated for different 3-dB bandwidths as described further below. Notably, proper filter selection results in substantially improved performance compared to a direct detection (DD) system and PAM4 QCR ORx with wide bandwidth (>70 GHz) or narrow bandwidth (30 GHz) filters. With a LPF bandwidth around 35 GHz, the response becomes almost flat up to 18 GHz, which provides consistent performance for a 25 Gbps (12.5 Gbaud) PAM4 system.

Figure 6C:
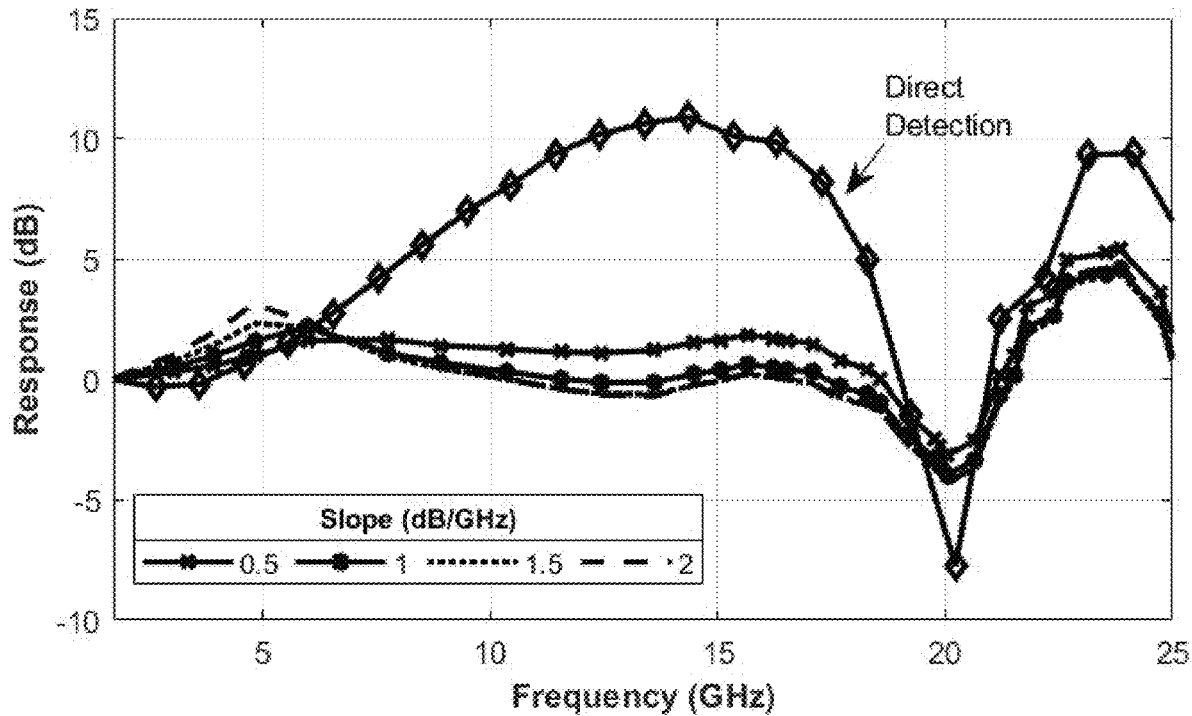
Figure 6D:
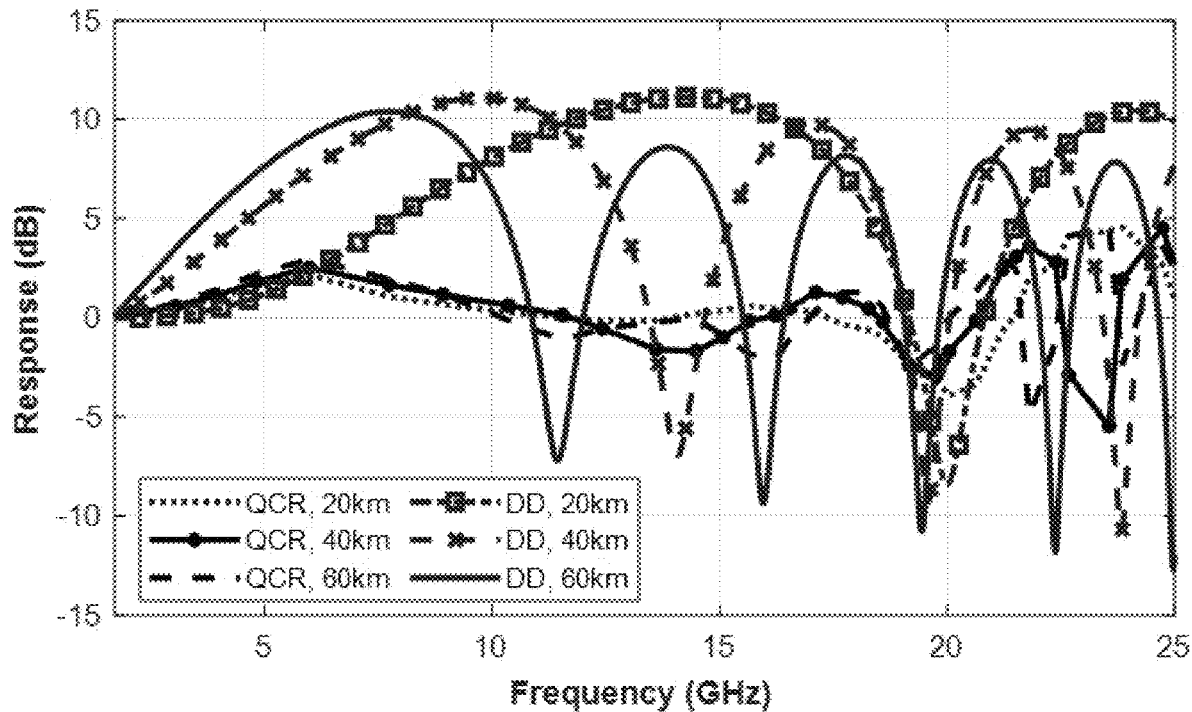

FIG. 6C shows the effect on system performance of varying the filter slope of a 37 GHz bandwidth trapezoidal filter. The consistent performance of the system relative to the filter slope suggests that the system performance should be consistent with distance, which is shown in FIG. 6D.

In physical systems, it may be desirable to implement a filter shape that resembles a trapezoidal filter, such as a SuperGaussian (SG) filter, that may be more easily implemented. For example, as shown in FIG. 6A, a 4th order SG filter with a 3-dB BW of 37 GHz closely matches the shape of the trapezoidal filter and may be easier to implement.

In practice, it may be desirable to provide a feedback loop to adjust the position of the filter based on the BER and maximum symmetric eye opening of PAM4 signal. For example, it may be desirable to have a default position of positioning the signal, $f_{IF}$, at the 3-dB attenuation point of the filter and adjust the positioning of the PAM4 frequencies based on the BER performance.

Rectification may be applied digitally or analogically. Using a rectifier may provide reduced computational complexity and/or hardware and accordingly reduced overall cost. For example, the rectifier may be used without an analog/digital (A/D) converter. Rectification may be performed as half-wave rectification such that either the positive or negative part of the signal is removed. Half-wave rectification may be possible with a gate with a non-linear transfer function. A gate may be biased such that the e.g., negative part of the signal is lower than the threshold of the gate. Rectification may also be performed as full-wave rectification such as a squaring element, where all negative values are converted to positive values and may be implemented in hardware or software. When implemented in software, an analogue/digital converter may be implemented before processed in a digital signal processer (DSP). Various other solutions may however be possible. Examples of analogue rectifiers include XOR gates, and diode bridges. Both the XOR gates and the diode bridges allow for real-time signal processing without DSP and may thus be preferred over a DSP in embodiments attempting to reduce cost.

The rectifiers 44 may be implemented as envelope detectors. A first envelope detector/rectifier 44 may be used to convert one of the electrical signals from one of the photodiodes to a non-inverted data signal. A second envelope detector/rectifier 44 may be used to convert the other, or second, electrical signal from the other photodiode to an inverted data signal. The inverted and non-inverted electrical signals may then be combined to provide the electrical data signal. The combiner 48 may be a differential amplifier that performs a subtraction to recombine the signal or other subtractors as may be known in the art. The combined electrical signal may then be further processed by the optical receiver 30 and/or further transmitted in or out of the system 10.

Simulations of exemplary DML-QCR system 10 of the present invention to show the impact of the present invention on system performance. The simulation implements the QCR discussed in Jensen et al., Proc. of OFC 2020, Paper M1F.4, the disclosure of which is incorporated herein by reference, using OptiSystem 18 and MATLAB R2021b. The DML was modeled with a bias current of 125 mA, modulation peak current of 6 mA, 3 dB bandwidth of approximately 10 GHz, output power of 12 dBm and ER of 1.5 dB, emitting 25 Gbps PAM-4 signals into optical fiber having the characteristics of SMF-28. The intermediate frequency (IF) was set to 38 GHz. The LO has an output power of 10 dBm and LW of 10 MHz. The PD responsivity and the TIA transimpedance gain were set to 0.7 A/W and 3 kΩ respectively. A noise equivalent bandwidth of 33 GHz and input noise density of $12\times10^{-12}$ A/Hz$^.5$ were used for the TIA. A high-pass filter (HPF, Butterworth, 4th order, BW=22.5 GHz) and a low-pass filter (LPF) precede the squaring, which is followed by 1st order Gaussian LPFs (LPF-2 in FIG. 4) with BW=9 GHz. The LPF was modeled with a trapezoidal filter and the magnitude response of the system was calculated for different bandwidths and slopes of the LPF.

FIG. 6D shows results using a trapezoidal filter of slope 0.5 dB/GHz and BW=37 GHz for the LPF. As can be seen, the magnitude response of the simulated system remains almost flat for fiber lengths of 20 km, 40 km and 60 km. For comparison, simulations performed using direct detection ("DD") showed power notches in the system response, which became more frequent with higher distances indicating the power notches in the system response were likely induced by the interplay of fiber dispersion and DML chirp. The comparison shows the improved performance of DML-QCR system of the present invention relative to DML-DD systems.

Figure 7A:
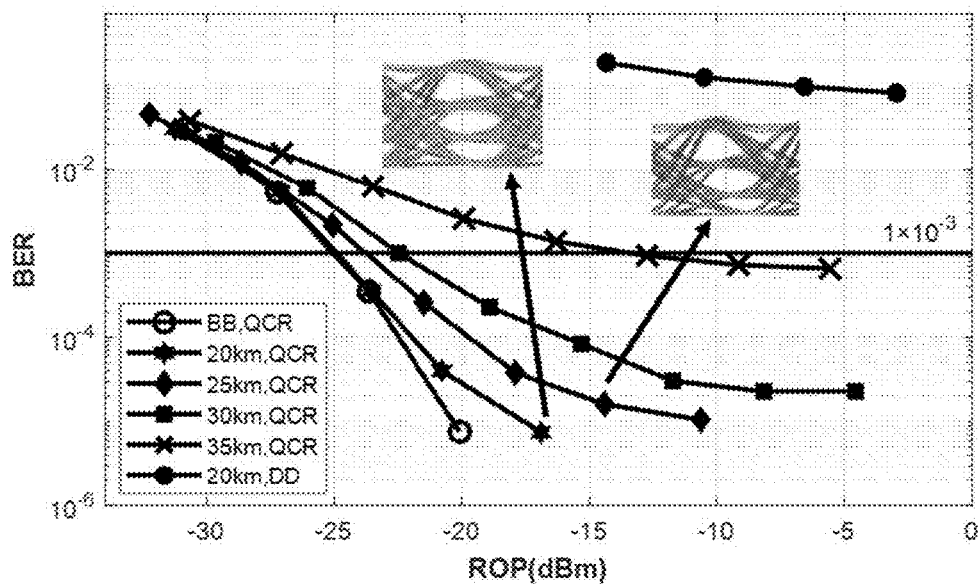
Figure 7B:
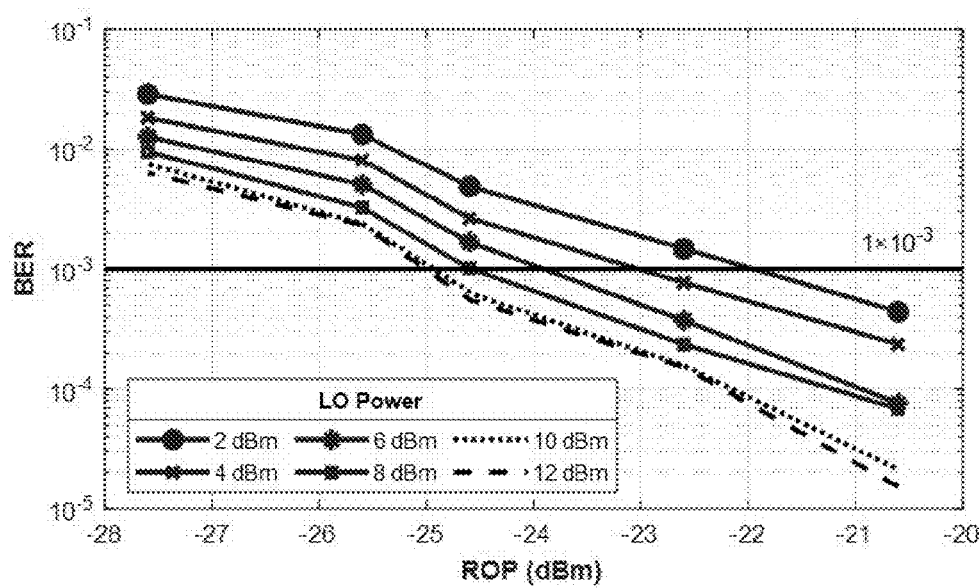

FIG. 7A-7G show the effect of various system parameters on the performance of the system FIG. 7A shows the BER versus received optical power ("ROP") for DD and QCR for different distances. Compared to back-to-back, there is almost no penalty for 20 km with QCR. Even though the system response remains flat for higher distances with QCR (FIG. 6), the deterioration in performance for higher distances shown in FIG. 7A originates from the higher skew and unequal eye opening in the receiver as can be observed from the two eye diagrams in FIG. 7A. Adiabatic chirp of the DML may be a cause of frequency modulation of the signals which causes the higher level to have higher frequency offset and hence it reaches the receiver earlier, leading to skew in the eye. To mitigate eye skew and unequal eye opening in DML-based C-band systems, DSP techniques known in the art may be employed, such as those described in Zhou et al., Applied Sciences 9.11 (2019): 2342, the disclosure of which is incorporated herein by reference. FIG. 7B shows that increasing the LO power from 2 dBm to 6 dBm improves the receiver sensitivity by approximately 1 dBm per dBm of LO power. For higher values of LO power, the improvement in receiver sensitivity starts to decrease and there is negligible improvement for LO power beyond dBm in the simulations. Similarly, as the linewidth ("LW") of the LO becomes narrower, the improvement in receiver sensitivity decreases and for LW below 10 MHz, there is no significant improvement in performance as shown in FIG. 7C in these simulations. This is important from a commercial perspective since lasers with broader LWs are generally lower cost.

The ER of the DML also plays an important role in system performance. While higher ER results in greater eye opening, it increases the adiabatic chirp induced frequency modulation of the signal and hence increases the eye skew. As shown in FIG. 7D, system performance improves as ER increases up to 3 dB and then deteriorates for higher ER in this simulation as will be further described below.

Figure 7E:
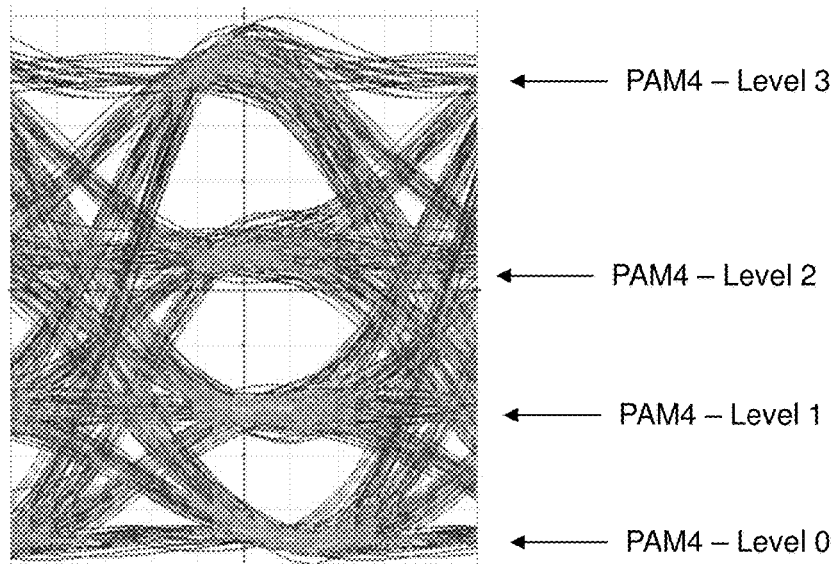
Figure 7F:
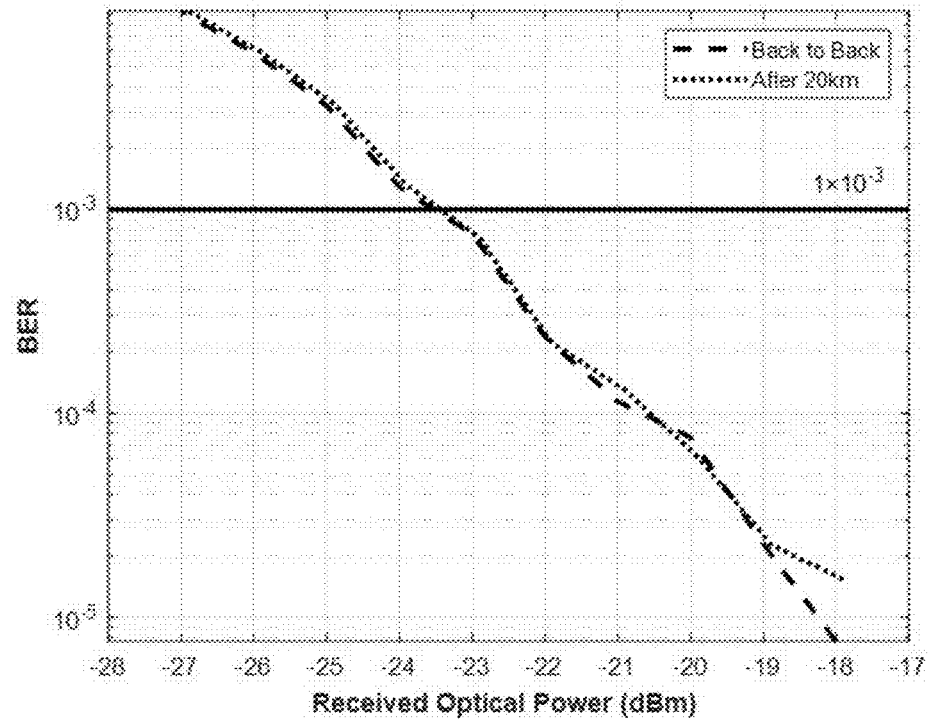

FIG. 7E shows an eye diagram for the PAM4 signal following a propagation distance of 20 km. While the diagram shows somewhat unequal openings for different eye levels of the PAM4 after 20 km, there is almost no receiver sensitivity penalty compared to the back-to-back case as shown in FIG. 7F. For longer transmission distances, it may be desirable to implement DSP techniques, as noted above, to maintain or improve system performance. These simulation results suggest that improved system performance may be achieved with DML-QCR systems of the present invention.

Figure 7G:
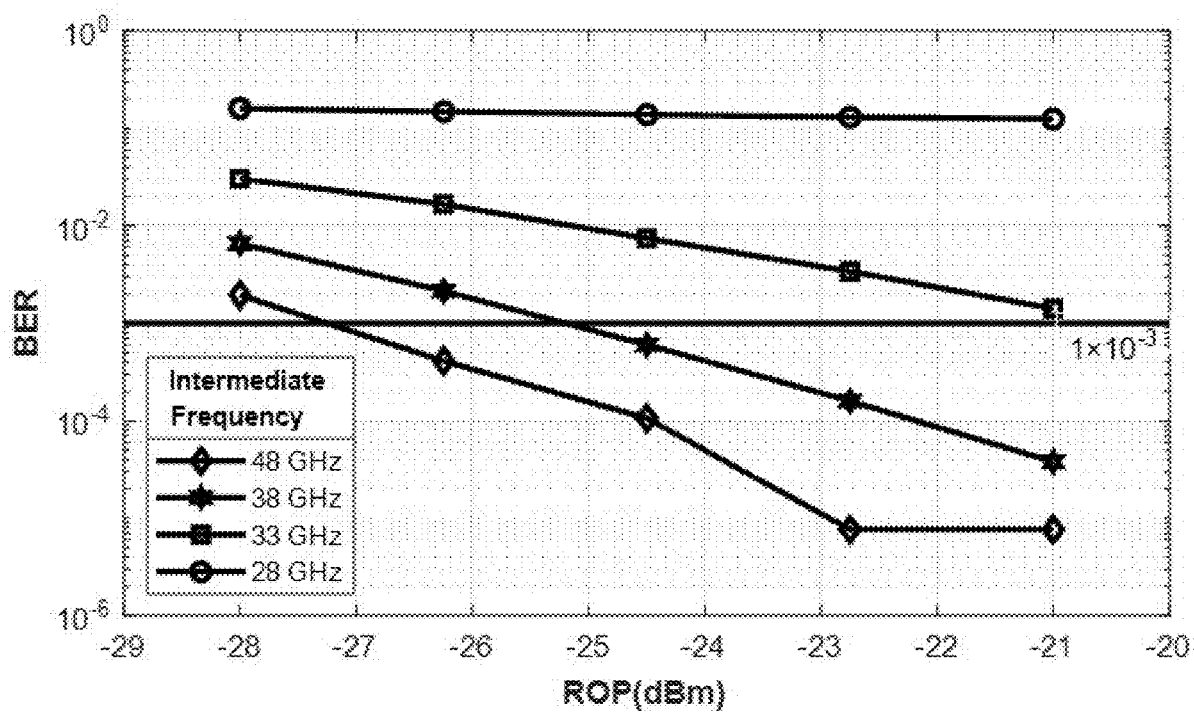

FIG. 7G show simulation results for the simulation described above, but with varying the intermediate frequency, $f_{IF}$, which is the frequency difference between the incoming optical signal and the LO. In various embodiments, it may be desirable to adjust the frequency of the LO, $f_{LO}$, which adjusts the intermediate frequency, $f_{IF}$, to tune the performance of the system 10 for a particular installation.

In various embodiments, the ER of the DML OTx in a link may be adjusted upon installation, periodically, or continuously depending upon the system configuration to improve the bit error rate (BER) performance of optical signals being transmitted through the link. The optimal ER range for a DML transmitter in a given link may vary depending upon various link parameters, such as laser characteristics, transmission distance, the optical fiber, receiver characteristics, etc. In some applications, the optimal ER setting for a link may not be the maximum achievable ER for the DML OTx.

FIGS. 8A & 8B depict exemplary embodiments that may be used to adjust the ER of a DML OTx based on system performance at various points in time. For example, the OTx may perform ER adjustment as part of a start-up sequence (after being plugged and powered up, and after initial setup process to tune, for example, its wavelength, etc.). In an initial state, the OTx may transmit a continuous wave (CW) at a first power $P_1$. Upon receiving the CW, the ORx may tune the LO frequency and record the detected voltage as a function of the LO frequency in a voltage monitor positioned after the rectifier and determine the LO frequency that provides the maximum voltage for the $1^{st}$ power. Following the LO frequency scan at the $1^{st}$ power, the OTx transmits the CW at a second power $P_0$ and the maximum received voltage is determined from the LO frequency scan. From these measurements, the adiabatic frequency change for two power levels: $f_{ad(1-0)}$ may be determined by the difference between the LO frequencies for the maximum voltage at the first and second powers. In addition, the optical modulation amplitude (OMA) and ER may be calculated as $$OMA = P_1 - P_0$$

$$ER = P_1/P_0$$

The laser parameter Lp may then be calculated as:

$$Lp = \alpha\kappa = (4\pi f_{ad(1-0)})/OMA, \text{ where}$$

α is the linewidth enhancement factor, and
κ is adiabatic chirp constant.

The ER of the laser may then be adjusted to a target amount. For example, it may be desirable for the adiabatic chirp $f_{as(1-0)}$ to be equal to B/2, where B is the baud rate, then the target OMA would be OMA=$2\pi$ B/Lp. The ER of the laser may be adjusted and the process repeated to achieve the ER for the target OMA setting. The ER may also be varied based on the BER of a deployed link. Additionally, this process may be run periodically after installation and turn-up to adjust for laser performance drift over time.

Figure 9:
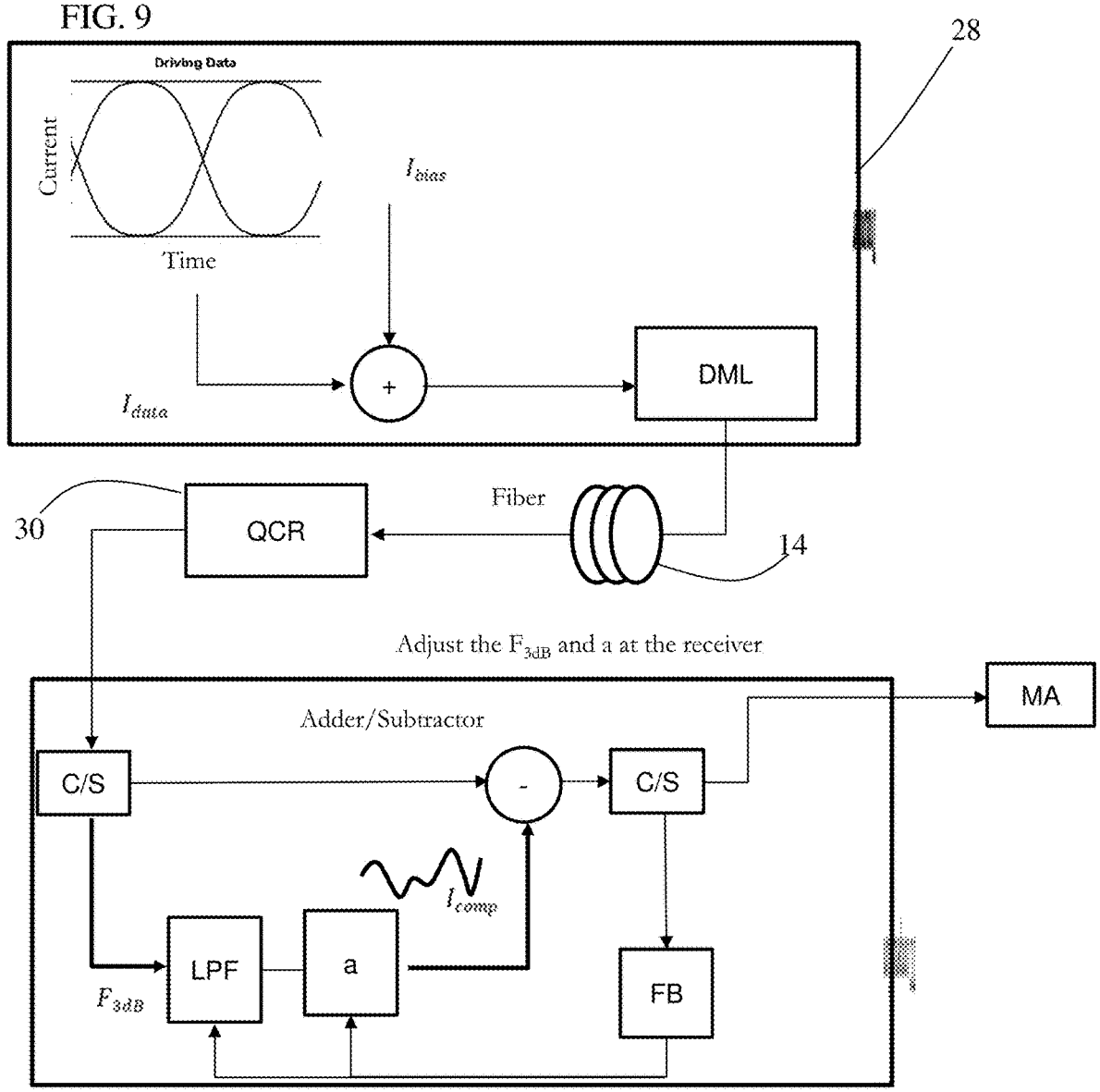
FIGS. 9-10 depict exemplary thermal chirp migration receiver embodiments and methods, respectively.

FIG. 9 depicts exemplary thermal chirp compensation receiver embodiments. In various embodiments, the ORx is configured to compensate for thermal chirp in the OTx by applying a slow modulation to the received signal. The modulation of the received signal may be controlled using various feedback and feed forward loop to improve the receiver performance. In various embodiments, the thermal chirp compensation may be applied at the OTx 28, but may require feedback from the receiver 30 if it is desired to adjust the thermal chirp compensation based on BER or other receiver parameter.

Figure 10:
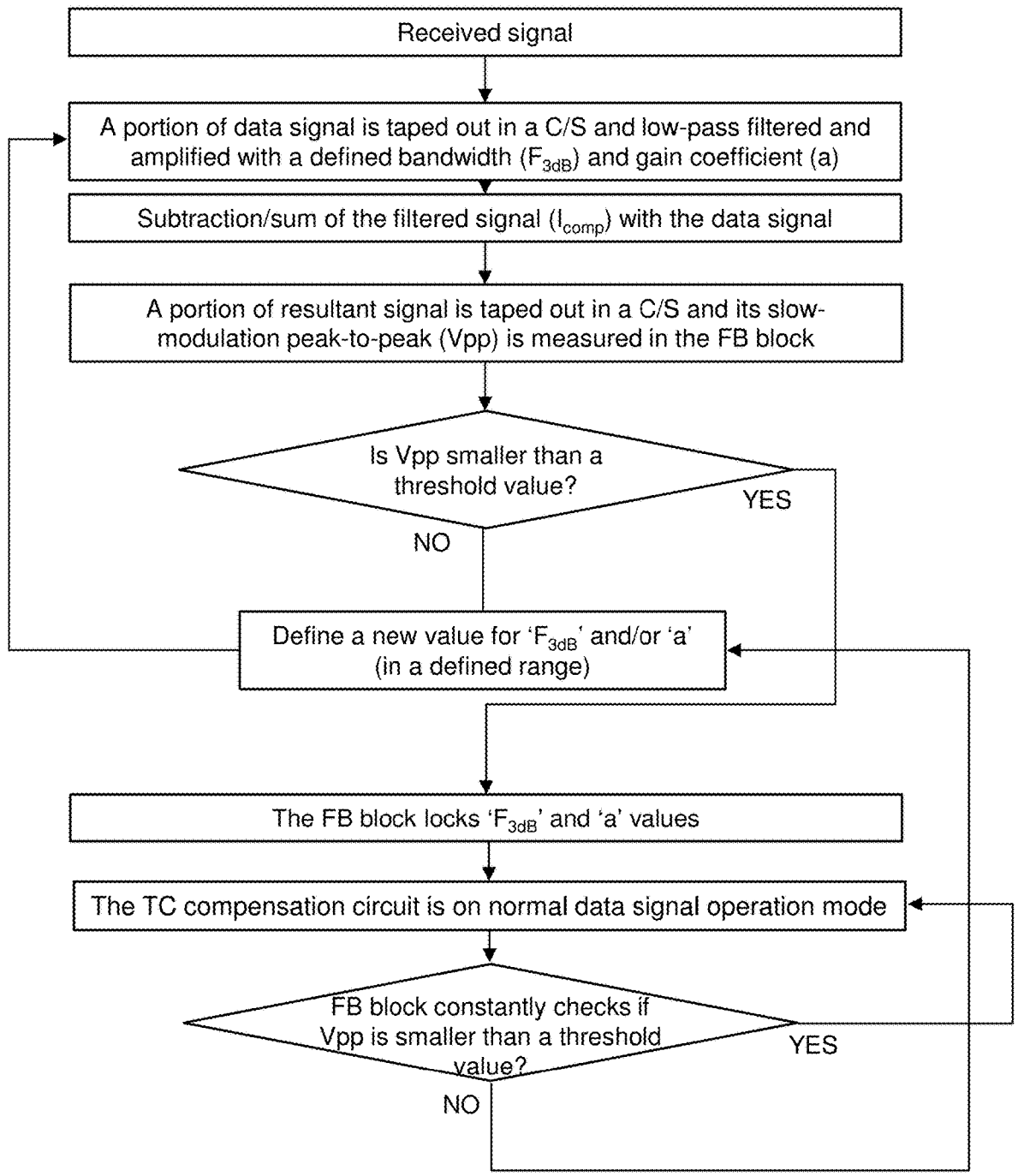

FIG. 10 depicts exemplary methods for compensating for the thermal chirp in systems 10 as depicted in FIG. 9. A first portion of the data signal output from the ORx 30 may be tapped from the main output signal using a first splitter (C/S). The tapped signal may then be low-pass filtered with a defined $F_{3dB}$ bandwidth to pass only the low frequency modulation components, which are then amplified with an amplifier having a gain coefficient (a) and combined with the main output signal to compensate for the low frequency modulation induced by the thermal chirp of the DML. Optionally, an envelope detector may be used in combination with the LPF. A feedback loop may be provided to adjust one or both of the LPF $F_{3dB}$ bandwidth and gain coefficient by tapping the combined signal with a second splitter to provide a second signal portion and determining the peak-to-peak voltage ($V_{pp}$) of the second signal portion and comparing the determined $V_{pp}$ with a target $V_{pp}$ until the target $V_{pp}$ is achieved. It will be appreciated that the thermal chirp compensation methods may be operated continuously or periodically to maintain a desired $V_{pp}$ or set initially during installation. It will be appreciated that the thermal compensation systems and methods of the present invention may be implemented proximate the optical transmitter and/or receiver. However, if the invention is implemented proximate to the transmitter, it may be necessary to implement additional receiver components to receive the optical signal. In addition, implementing the invention at the optical transmitter will not be able to compensate for additional low frequency impairments that may be introduced during transmission.

FIGS. 11A-11D show experimental simulation results using the method described above and depicted in FIG. 10 for a NRZ signal in which the compensation was applied to a transmit signal. By adjusting the LPF bandwidth and gain coefficient, a 50 MHz modulation was applied to the main signal, which reduced the $V_{pp}$ from 44 to 13 mV. FIGS. 11C & 11D show simulation results for a DML signal after 10 km propagation that is received by a QCR and distorted by thermal chirp. FIG. 11C shows the resulting eye diagram. The distortion evidences itself as a slow modulation signature on the signal. FIG. 11D displays the eye diagram post-thermal chirp compensation circuit, revealing a BER improvement by three orders of magnitude.

In practice, it may be desirable to perform methods of the present inventions on various component and systems during manufacturing testing, installation, test, and turn-up, and during operation and maintenance of the systems. For example, an optical transmitter 28 may be installed in a network to transmit optical signals as part of a single or multiple channel system 10 over an installed fiber 14 spanning the distance between two optical nodes. Following the installation and turn-up of the transmitter-receiver link, the BER of the link may be tested and the LO frequency may be adjusted according to the method of the present invention to adjust the attenuation of the PAM4 frequencies by the electrical filter to minimize the BER of signals being transmitted through the link. Similarly, the ER adjustment and thermal compensation methods of the present invention may be performed to improve the BER of the link. One of skill in the art may perform the aforementioned methods in different orders and iteratively to achieve the desired settings for the link.

In another aspect of the invention, novel filter design methods are disclosed herein for chirp managed lasers ("CML") to effectively identify appropriate optical and/or electrical filter shapes/profiles and offsets with respect to the signal spectrum, for use with DMLs having different laser parameters (α and K) and OMAs and modulation formats, to achieve desired/target CML output parameters including ER, OMA, and average power ("$P_{avg}$").

FIG. 12 depicts exemplary filter design and filter shape identification methods of the present invention. For a given bit rate (BR) and target transmission distance L, the OMA may be calculated as described above using laser parameters for the DML and baud rate B and dispersion D according to the equation:

$$OMA_{req} = \frac{2\pi}{\alpha\kappa}B$$

$$OMA_{max} = 0.2\left(\frac{1}{B}\right)\left(\frac{1}{LD}\right)\frac{c}{\lambda_0^2}\left(\frac{4\pi}{\alpha\kappa}\right)$$

where $OMA_{req}$ is the OMA required for a CML condition and $OMA_{max}$ is the maximum OMA for a maximum skew of 20% UI (unit interval) in the system.

The optical field of a DML may be expressed as:

$$E_{DML}(t) = A_{DML}(t)e^{i\varphi_{DML}(t)},$$

where $A_{DML}(t)$ is the amplitude and $\varphi_{DML}(t)$ is the phase of the optical field, $$A_{DML}(t) = \sqrt{P_{DML}(t)}$$

$$\varphi_{DML}(t) = \int \delta f_{DML}(t)dt$$

$\delta f_{DML}(t)$ is the frequency chirp of the laser, which may be described by the equation $$\delta f_{DML}(t) = \frac{1}{2\pi}\frac{d\varphi_{DML}(t)}{dt} = \frac{\alpha}{4\pi}\left(\frac{1}{P_{DML}(t)}\frac{dP_{DML}(t)}{dt} + \kappa P_{DML}(t)\right)$$

where $P_{DML}(t) = |A_{DML}(t)|^2$ is the optical power, α is the linewidth enhancement factor and κ is the adiabatic chirp coefficient of the DML.

The frequency chirp can be expressed as a combination of transient and adiabatic contributions corresponding to the first and second term of the equation. Transient chirp is a fast chirp that effectively occurs in the rising and falling segments of the modulation. For a given α, the transient chirp is approximately determined by $$\frac{dP_{DML}(t)}{dt} \approx \frac{OMA}{t_{\frac{rise}{fall}}}$$

and the laser output power $$\frac{1}{P_{DML}(t)}.$$

Therefore, for a given laser bandwidth (BW) (the rise time/fall time), the OMA and the average power (making up the Extinction ratio, $ER=(P_{avg}+OMA/2)/(P_{avg}-OMA/2)$) will determine the transient chirp. For a larger ER, the transient chirp will be larger, especially during the fall time in which $P_{DML}(t)$ becomes even smaller which in turn causes a larger frequency excursion to the lower, "red", frequency.

Continuing with FIG. 12, a target signal for the CML output may be set by the practitioner based on a desired $OMA_{CML}$ and $Pavg_{CML}$, which gives the CML extinction ratio, $ER_{CML}$. The optical field of the CML may then be calculated as:

$$E_{CML}(t) = A_{CML}(t)e^{i\varphi_{CML}(t)},$$

where $$A_{CML}(t) = \sqrt{P_{CML}(t)}$$

$$\varphi_{CML}(t) = \int \delta f_{CML}(t)dt$$

$\delta f_{CML}(t) =$ $$\frac{1}{2\pi}\frac{d\theta(t)}{dt} = \frac{\alpha}{4\pi}\left(X\frac{1}{P_{CML}(t)}\frac{dP_{CML}(t)}{dt} + Yk\left(P_{CML}(t) + \frac{Pavg_{DML}}{Pavg_{CML}}\right)\right)$$

$$X = \frac{P_{CML}(t)}{P_{DML}(t)}, Y = \frac{OMA_{DML}}{OMA_{CML}}$$

It will be appreciated that the $\varphi_{CML}(t)$ could be $\varphi_{CML}(t)$.

From the optical field, a filter transfer function may be calculated $$H(f) = E_{CML}(f)/E_{DML}(f)$$

where $E_{DML}$ (f)=FT {$E_{DML}$ (t)=$A_{DML}$ (t) $e^{i\varphi_{DML}(t)}$} is the Fourier transform (FT) of the DML signal and $E_{CML}$ (f)=FT {$E_{CML}$ (t)=$A_{CML}$ (t) $e^{i\varphi_{CML}(t)}$} is the FT of the target CML output signal.

Figure 13:
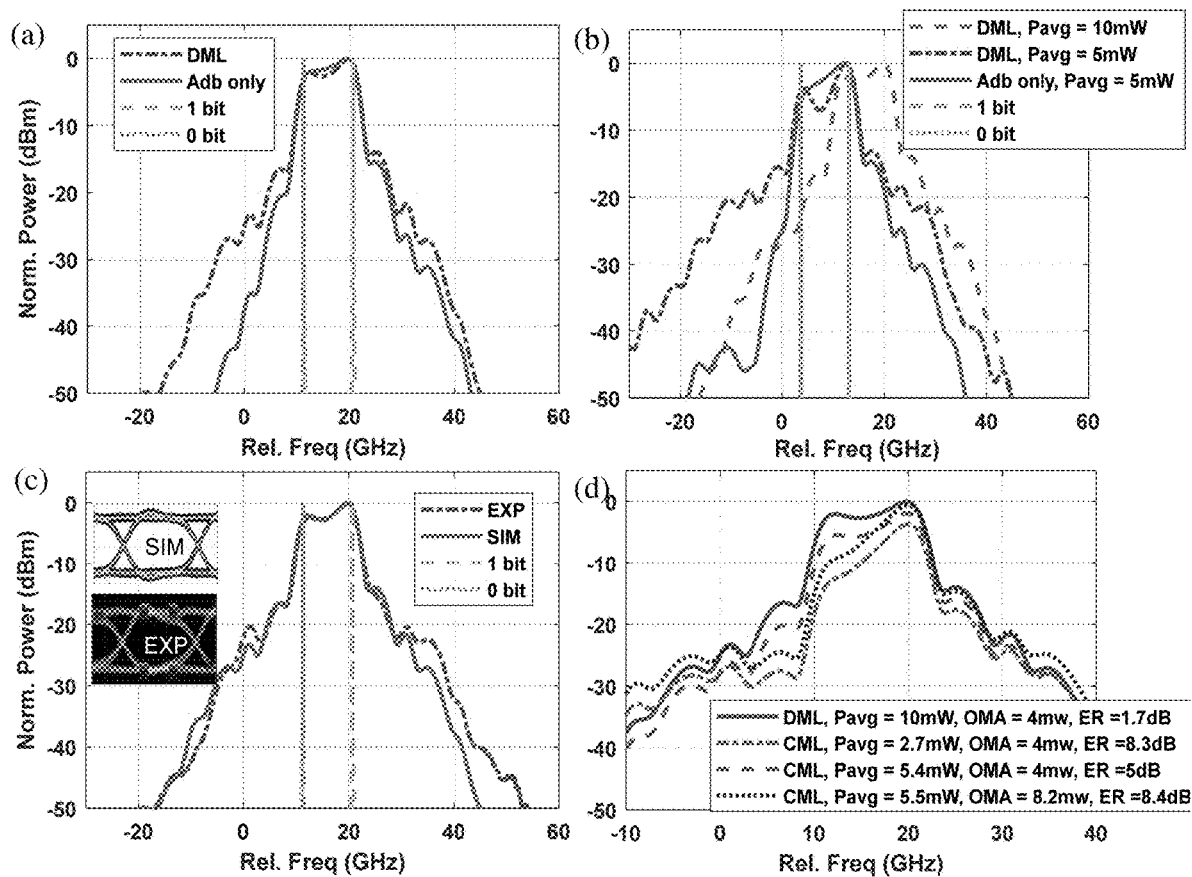
FIG. 13 shows the contribution of adiabatic and transient chirp and how the spectrum changes with different ER in a DML.

FIG. 13 shows the contribution of adiabatic and transient chirp in a DML with an OMA≈4 mW, and $P_{avg}$≈10 dBm (FIG. 13(a), ER≈1.7 dB) and $P_{avg}$≈7 dBm (FIG. 13(a) ER≈3.6 dB). Laser overshoot is also pronounced for larger ER. FIG. 13(c) shows a comparison of simulated and experimental results for power versus relative frequency produced by matching the spectra of a 10 Gbaud signal with a large OMA. FIG. 13(d) shows three examples of CML output spectra comparing to that of the DML spectrum. The input NRZ DML signal, solid blue curve, has a $P_{avg,DML}$=10 mW and $OMA_{DML}$=4 mW, results in an ER of 1.7 dB. If the $OMA_{CML}$=$OMA_{DML}$ and the average power may be reduced to obtain two ER values of 5 dB ($P_{avg,CML}$=5.4 mW), broken magenta curve, and 8.3 dB ($P_{avg,CML}$=2.7 mW), dotted brown curve. Alternatively, both the OMA and average power may be modified to obtain an ER of ~8.3 dB ($P_{avg,CML}$=5.5 mW and $OMA_{CML}$=8.2 mW), dotted black curve. It can be inferred from the figure that the CML spectral shape is similar for the same ERs, though with a lower average power.

Figure 14:
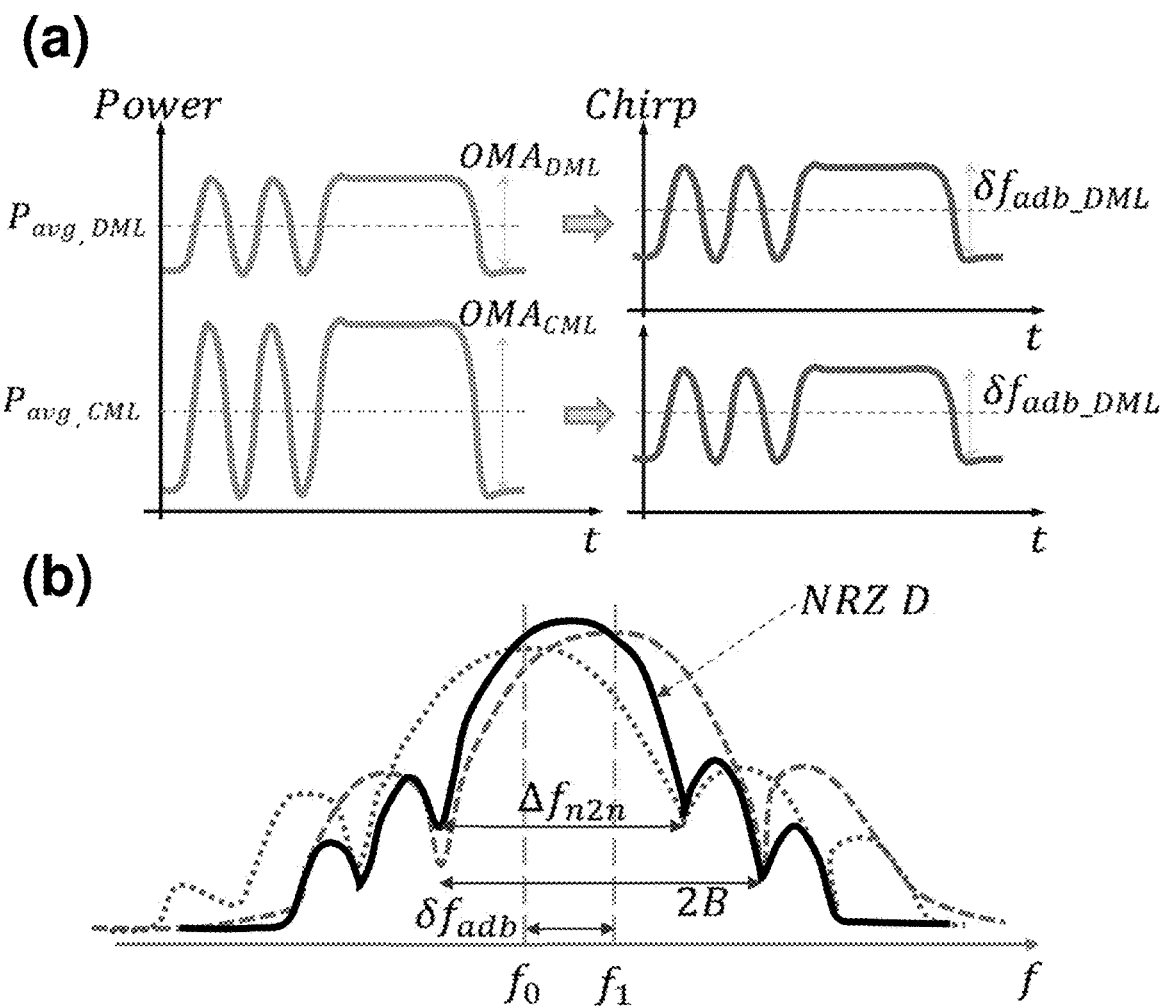
FIG. 14 shows the effect of power and chirp on the frequency distribution of a NRZ DML output signal.

FIG. 14 shows the effect of power and chirp on the frequency distribution of a NRZ DML output signal. In various methods, the input signal $P_{avg}$ and OMA may be modified to increase the ER without causing the transient chirp enhancement, as illustrated in FIG. 14(a). Thus, $E_{CML}$(t) should have an $A_{CML}$(t) which would be a modified version of $A_{DML}$(t) for a desired ER, provided the energy conservation is not violated, but a similar frequency chirp or phase: $\varphi_{CML}(t)=\varphi_{DML}(t)$. The spectrum of a DML signal may be comprehended as a combination of two sinc functions (Fourier Transform of a rectangular pulse with a width of bit-period and a linear phase whose slope corresponds to the bit power level) each centred around spectrum corresponding to 1 or 0 level, as shown in FIG. 14(b). By enhancing the ER (reducing the power in zero bits), the spectrum more mimics a spectrum centered around level 1 and then the peak shifts slightly towards one bit power spectrum (dashed green).

Figure 15:
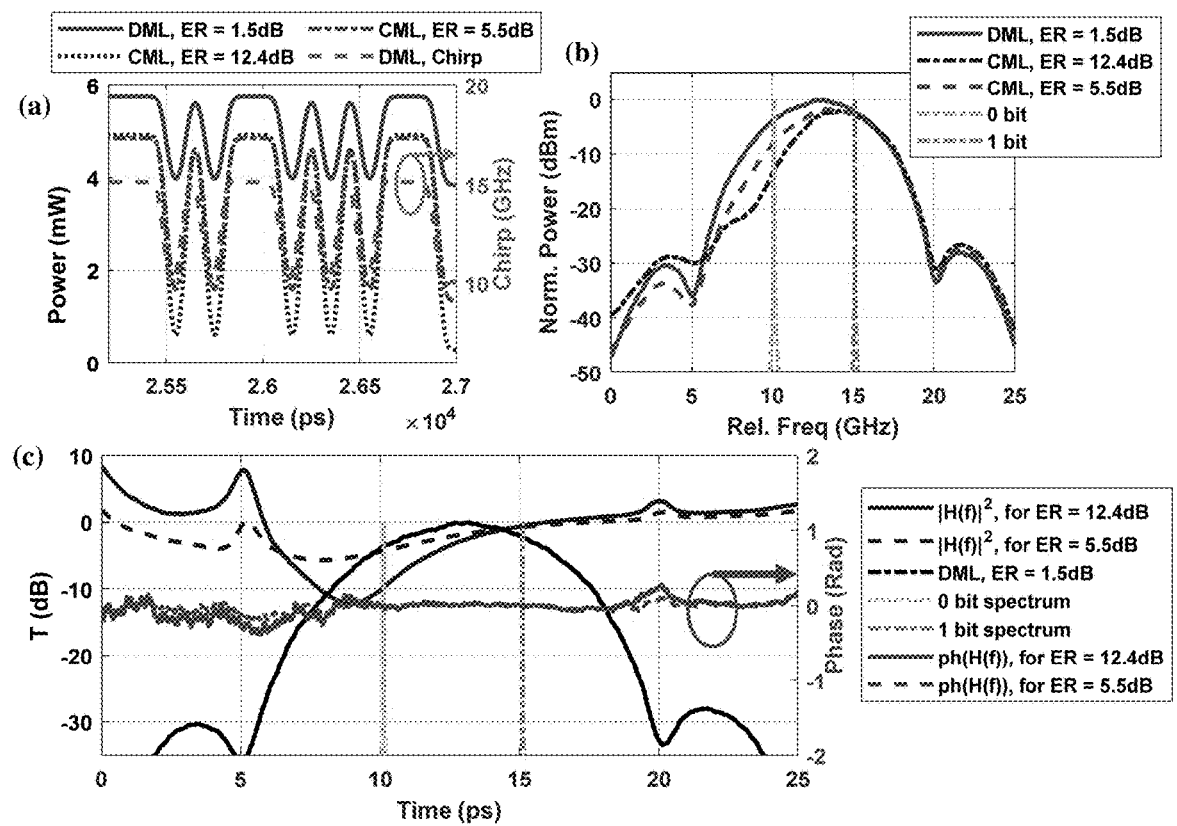
FIG. 15 shows a comparison of a DML performance with CML performance at two extinction ratios and target filter amplitude and phase response.

FIG. 15 shows a comparison of a DML performance with CML performance at two extinction ratios. FIG. 15(a) shows the input DML (ER=1.5 dB), and two target CML (ER~5.5 dB and ER~12 dB) optical powers along with the frequency chirp. In this example, a Gaussian filter shaper was used for the DML. FIG. 15(b) shows the respective power spectra $P_{DML}(f)$ and $P_{CML}(f)$. FIG. 15(c) shows the spectral amplitude and phase of the resultant H(f). The effective region of the filter is between the zero and one spectra, indicated by dashed yellow and green lines vertical lines. In this region, and nearly over the main lobe of the signal, the filter phase, ph(H(f)), is nearly flat. As desired, the filter amplitude response, $|H(f)|^2$, is falling from the one spectrum towards the zero spectrum.

Next, one or more target filter profiles may be identified that match, to the extent possible or as defined by the skilled artisan, the desired amplitude response of H(f) between zero and one spectrum. Numerical optimization techniques may be employed to match the filter profile, such as Nelder-Mead simplex algorithm (fminsearch) as described in J. C. Lagarias, J. A. Reeds, M. H. Wright, and P. E. Wright, "Convergence properties of the Nelder-Mead simplex method in low dimensions," SIAM Journal on optimization, vol. 9, no. 1, pp. 112-147, 1998. In the optimization, the minimum value of the objective function (fval) obtained by fminsearch may be used as a measure of the fitness of the resultant filter with respect to the target filter profile with lower values of fval being indicative a better fit to the amplitude response of the transfer function.

The filter design method may be further described using an example as presented in A. S. Karar, "Digital signal processing for directly modulated lasers in optical fiber communications." Queen's University (Canada), 2013 ("Karar"), to compare the outcome of the present procedure to prior procedures. In the example, a 10 Gbps NRZ CML has $$\alpha \approx 3, k \approx 11 \; \frac{\text{GHz}}{\text{mW}},$$

and EOBW$_{3\,dB}$≈5.0 GHz (this bandwidth would only keep one strong lobe on both sides of the spectrum, as seen in FIG. 15(b)). The OMA is set to OMA$_{DML}$=1.9 mW to satisfy $\delta f_{adb}$=B/2 condition. Using a Bessel filter of order 3 and BW$_{3dB}$7.11 GHz, an ER of ~12 dB is achieved.

Figure 16:
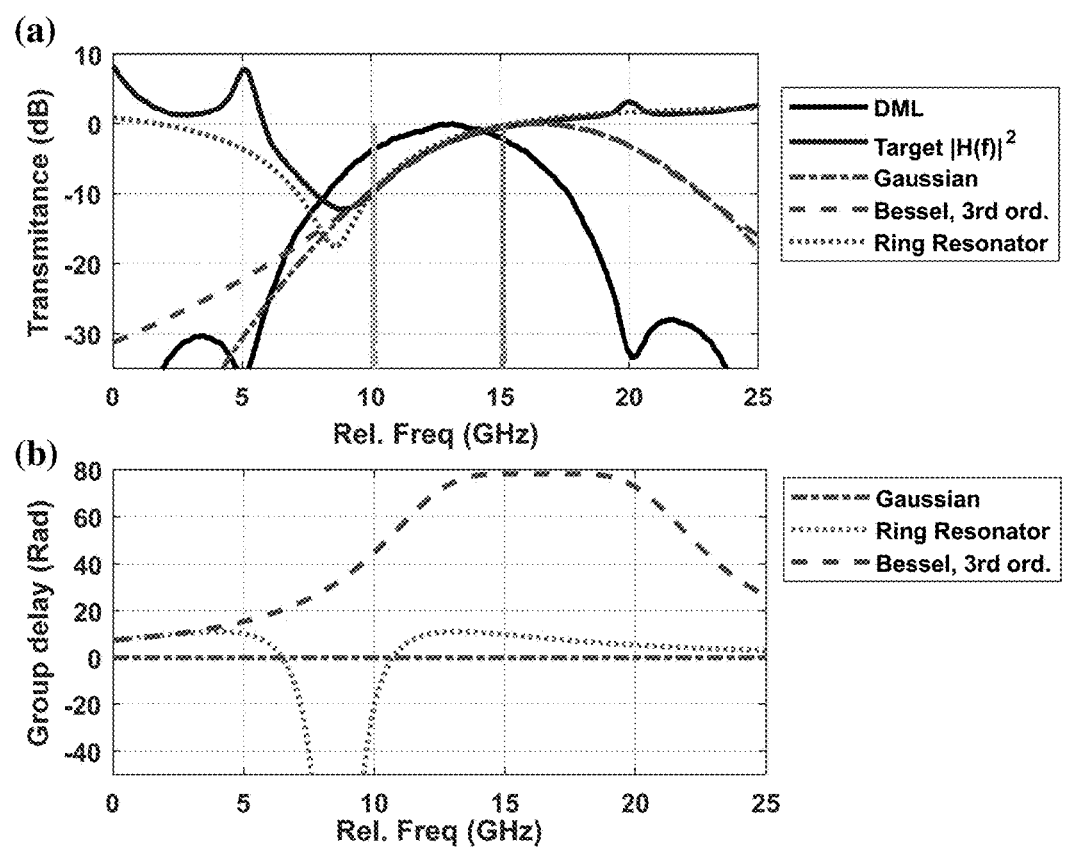
FIG. 16 shows the transmittance and group delay versus frequency for various filters.

As shown in FIG. 16A, the transmittance performance of the designed with the present invention is very similar to the performance of the filter used in Karar, and provides a good matching (fval~4.8) to the target filter profile for a CML with an ER~12 dB. The method of the present invention was used to identify a filter profile with the same Bessel order (labeled "Bessel" in the FIGS. 16(a)&(b)), but a slightly narrower bandwidth of approximately 6.8 GHz (fval~4.1) and generally the same filter performance of the CML over the range of interest. FIG. 16(a) also shows the performance of two other filter profiles identified using the present inventive method 1) a Gaussian filter of 7.11 GHz BW (fval~5.7) and a micro-ring resonator (MRR) filter with a Q factor of 7281 (fval~5.3), both of which show good match with the target filter profile. As shown in FIG. 16(b), Bessel filter has a group delay that is the opposite of SMF which may be beneficial for longer distances.

Figure 17:
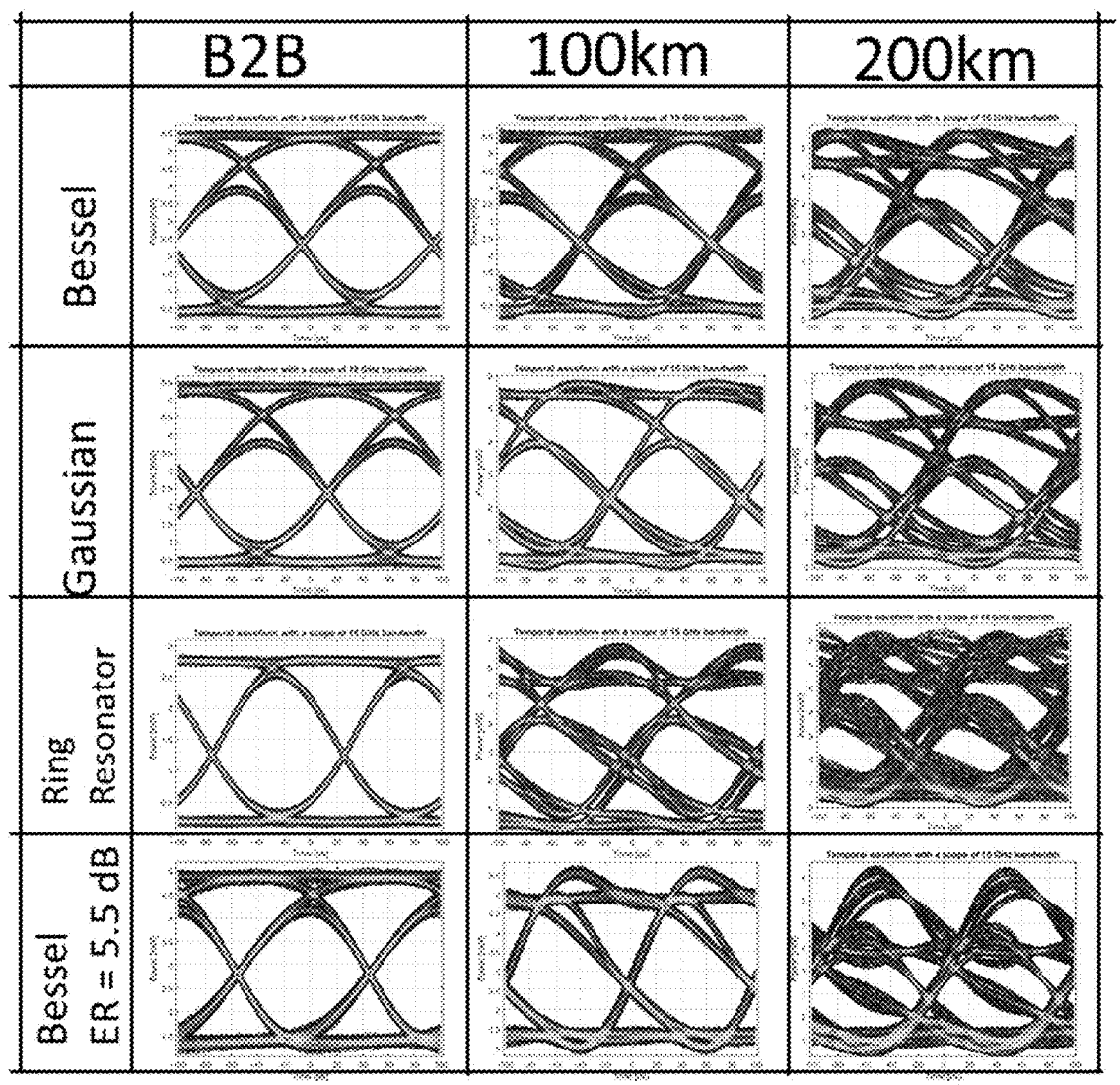
FIG. 17 shows eye-diagrams for transmission simulations for three filters for over three distances.

FIG. 17 shows eye-diagrams for transmission simulations for three filters for over three distances, back-to-back ("B2B") or 0 km, 100 km and 200 km for the CML and achieve the target ER~12 dB. The bottom row of FIG. 17 shows the eye-diagrams for a target ER of ~5.5 dB using the present inventive method to identify a Bessel filter with a BW of 11 GHz and order of 1 that provides good transmission performance.

As seen from FIG. 17, the best CML output, i.e., B2B, is achieved with the ring resonator, as there is almost no inter symbol interference (ISI). However, for a longer propagation of the signal in the optical fiber, a filter may be chosen that also narrows the signal spectrum, as the case with Gaussian and Bessel filters. Additionally, a Bessel filter may be chosen over Gaussian because of its group delay that compensates for some dispersion as noted above with respect to FIG. 16(b). One of ordinary skill in the art will appreciate that the methods described herein may be used to identify filter profiles to tailor low-speed DML spectrum and enable enhanced modulation and transmission speeds.

In addition, the methodology of the present invention may be used identify filters for use with multi-level signals, such as PAM4 and PAM8 signals. For example, using a DML with a $$\alpha \approx 4, k \approx 5.25 \; \frac{\text{GHz}}{\text{mW}},$$

the EO response of the DML may be modeled using a Gaussian filter of 6 GHz BW.

Figure 18:
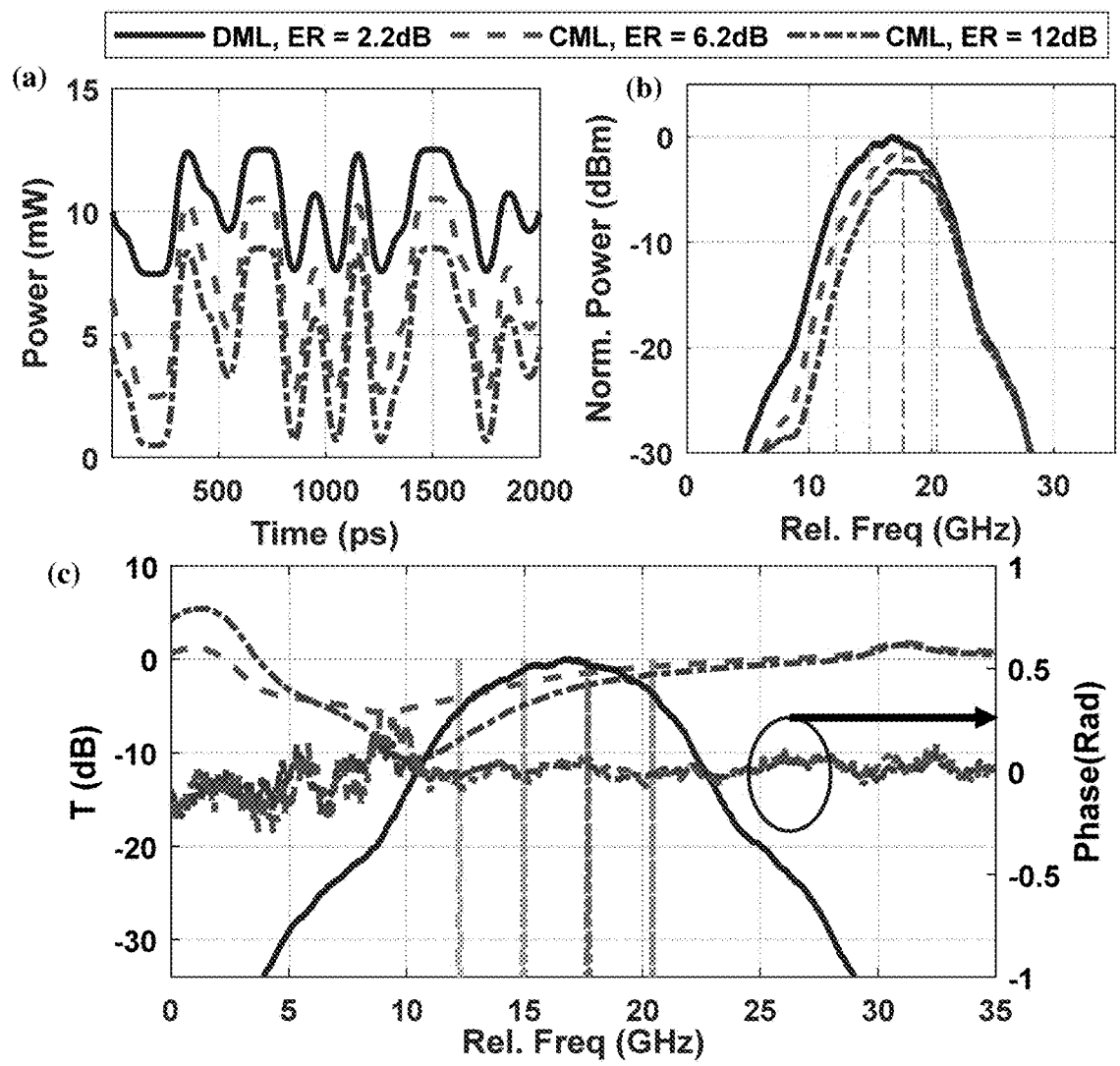
FIG. 18 shows DML and target CML optical power, and spectrum and required filter requirements for a PAM4 signal.

FIG. 18 shows DML and target CML optical power, and spectrum and required filter requirements for a PAM4 signal. FIG. 18(a) shows the optical power of the input DML (ER~2.2 dB), and two target CMLs (ER~6.2 dB and ER~12 dB). FIG. 18(b) shows the respective power spectra $P_{DML}(f)$ and $P_{CML}(f)$. Analogous to the NRZ case, the spectrum of a PAM4 DML signal can be comprehended as a combination of four sinc functions each centered around each level continuous wave ("CW") power spectrum. By enhancing the ER, the spectrum shifts towards the highest power level (P3) spectrum.

FIG. 18(c) shows the spectral amplitude and phase of the resultant filter H(f). The effective region of the filter is between the zero and three spectra, indicated by dashed yellow and green lines. Also similar to inventive filter for NRZ signals, the spectral phase of the filter is nearly unchanged over the main lobe of the signal.

Figure 19:
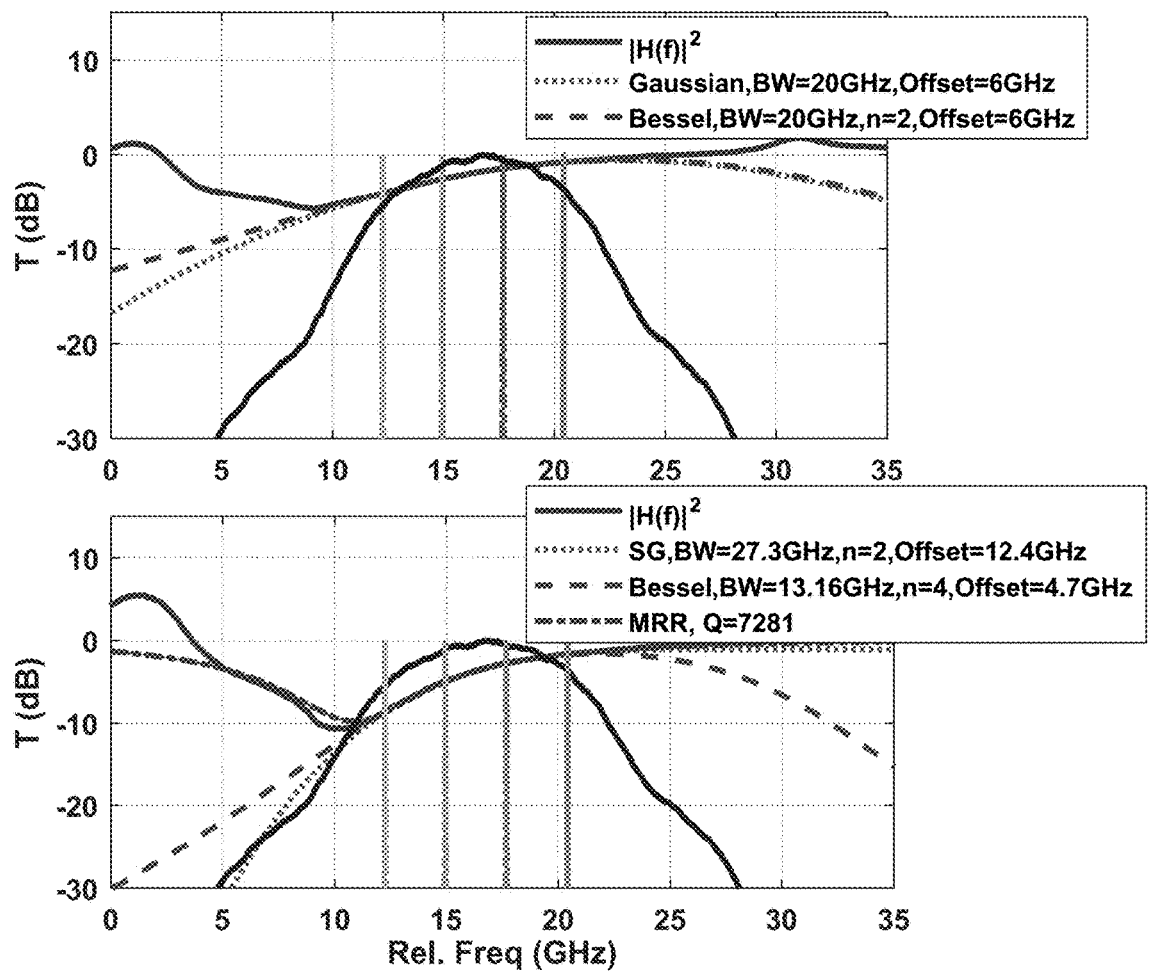
FIG. 19 displays the filters that were identified to match the spectral amplitude of design H(f) for the frequency range between zero and three spectra.

FIG. 19 displays the filters that were identified to match the spectral amplitude of design H(f) for the frequency range between zero and three spectra for (a) an ER~6.2 dB, and (b) ER~12 dB. For an ER of 6.2 dB, a Bessel filter of second order with a bandwidth of ~20 GHz and a Gaussian filter with a bandwidth of ~20 GHz exhibited the best match, as evidenced by fval values of 0.93 and 1.1. For an ER of 12 dB, three filters matched well, which are a fourth-order Bessel filter with a bandwidth of ~13.1 GHz, a SuperGaussian (SG) filter with a bandwidth of 27 GHz, and an MRR with a Q-factor of 7480. The corresponding fval values were 2.03, 2.13, and 1.7, respectively, which are higher compared to those obtained for the 6.2 dB ER.

Figure 20:
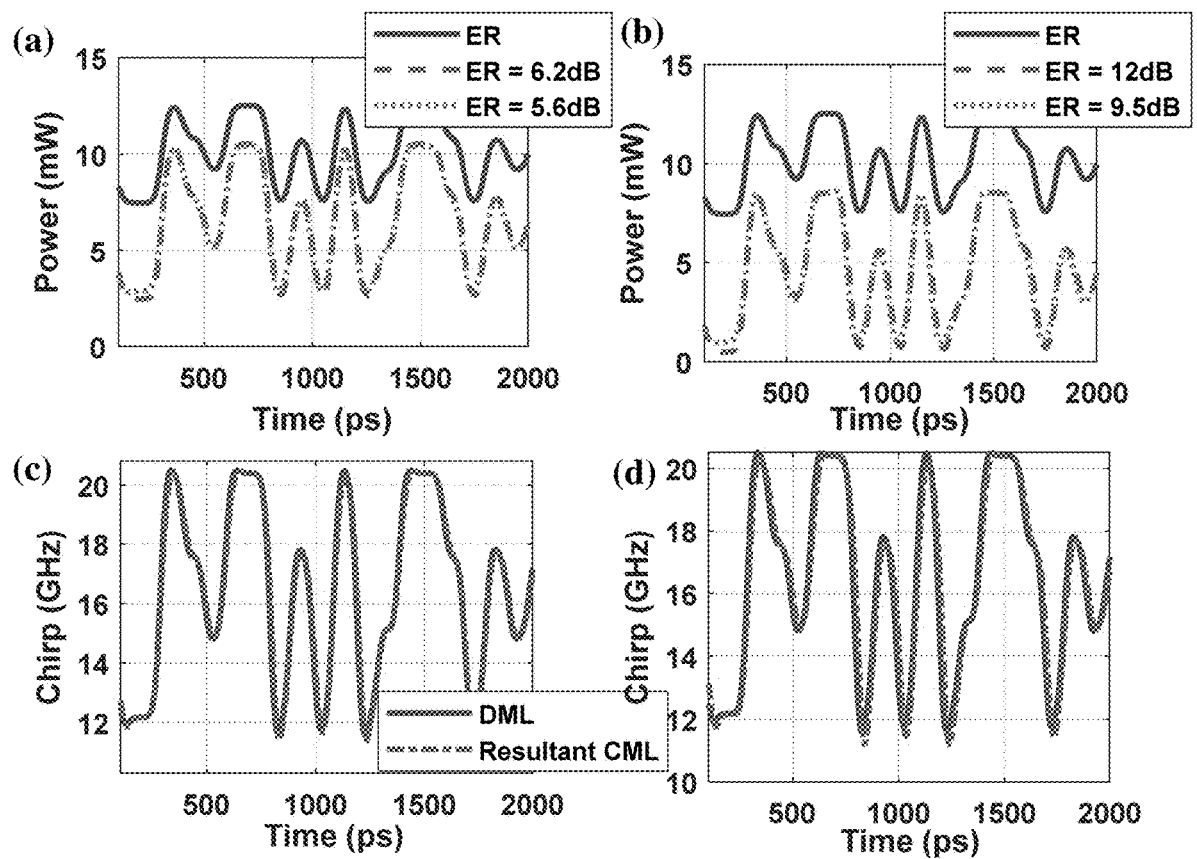
FIG. 20 shows the temporal power and frequency chirp for various filters.

FIG. 20 shows the temporal power and frequency chirp of the DML output, target CML, and resultant CML using the Bessel filter identified for ER of 6.2 dB and the SG filter identified for ER of 12 dB. The target and resultant CMLs demonstrate a good level of agreement, indicating the appropriate selection of the identified filters. However, the achieved ER value is lower than the anticipated value for both cases, i.e., 5.6 dB and 9.5 dB respectively. Similar to NRZ CMLs, the selection of the most suitable filter from the identified options may be influenced by the propagation of the signal over optical fiber.

Figure 21:
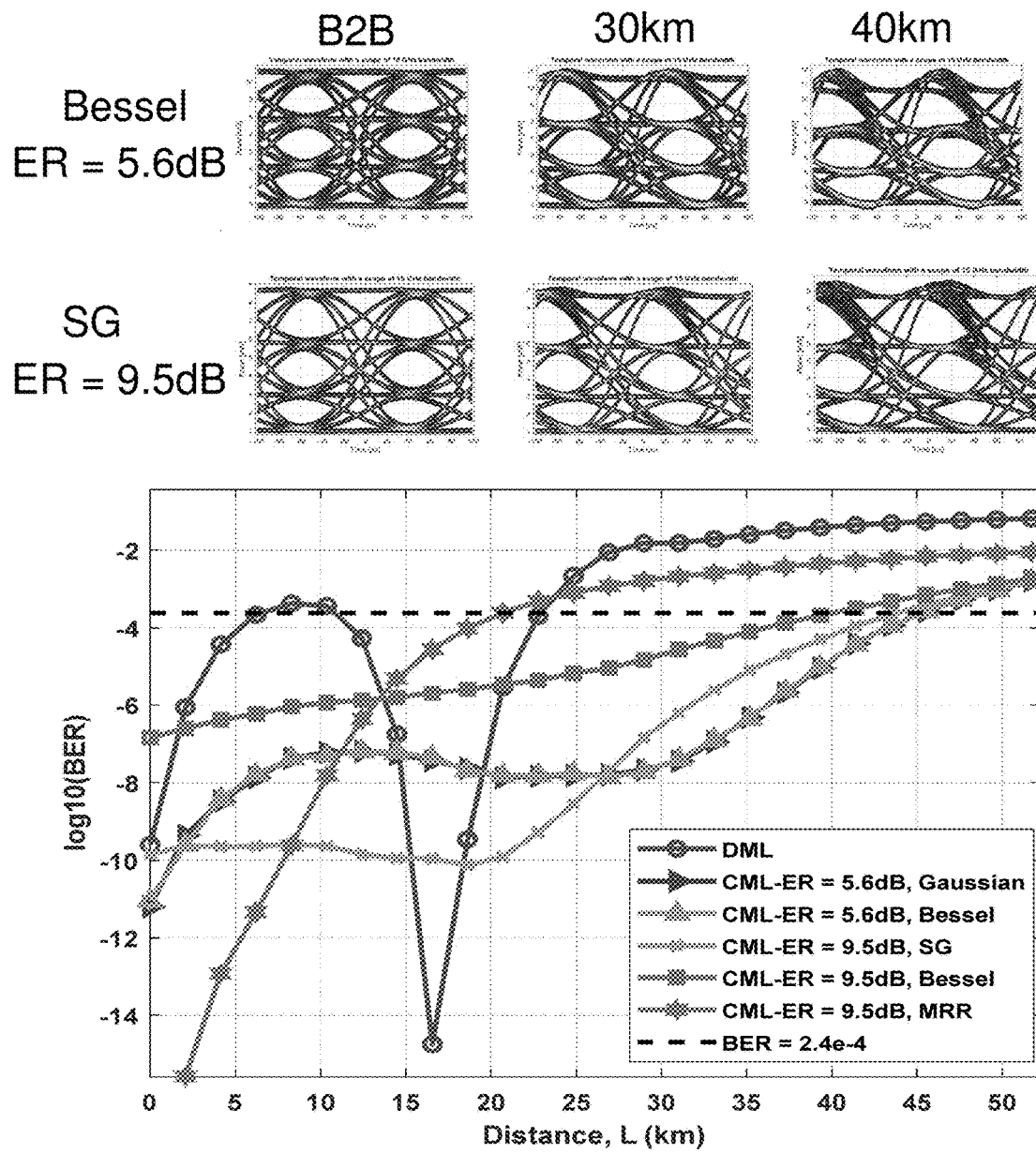
FIG. 21 depicts the eye-diagrams and BER vs distance for the filters specified in FIG. 19.

FIG. 21 depicts the eye-diagrams and BER vs distance for the filters specified in FIG. 19, with a received optical power (ROP) of −10 dBm. Both identified filters targeted for an ER of 6.2 dB (5.6 dB achieved) yield the same BER over fiber distance. For the target ER of 12 dB (9.5 dB achieved), the MRR filter shows better performance up to 8 km, the SG filter shows better performance for fiber propagation up to 40 km.

It is notable that as the ER value increases, such as with an ER of 12 dB, the CML output exhibits a tendency towards an asymmetric eye opening. To counteract this asymmetry, level dependent non-linearity compensation may be used to create a non-uniform eye from the RF transmitter to counteract the non-linearity introduced by the optical filter, such as described in H. Li et al., "A 3-D-integrated silicon photonic microring-based 112-Gb/s PAM-4 transmitter with nonlinear equalization and thermal control," IEEE Journal of Solid-State Circuits, vol. 56, no. 1, pp. 19-29, 2020".

Figure 22:
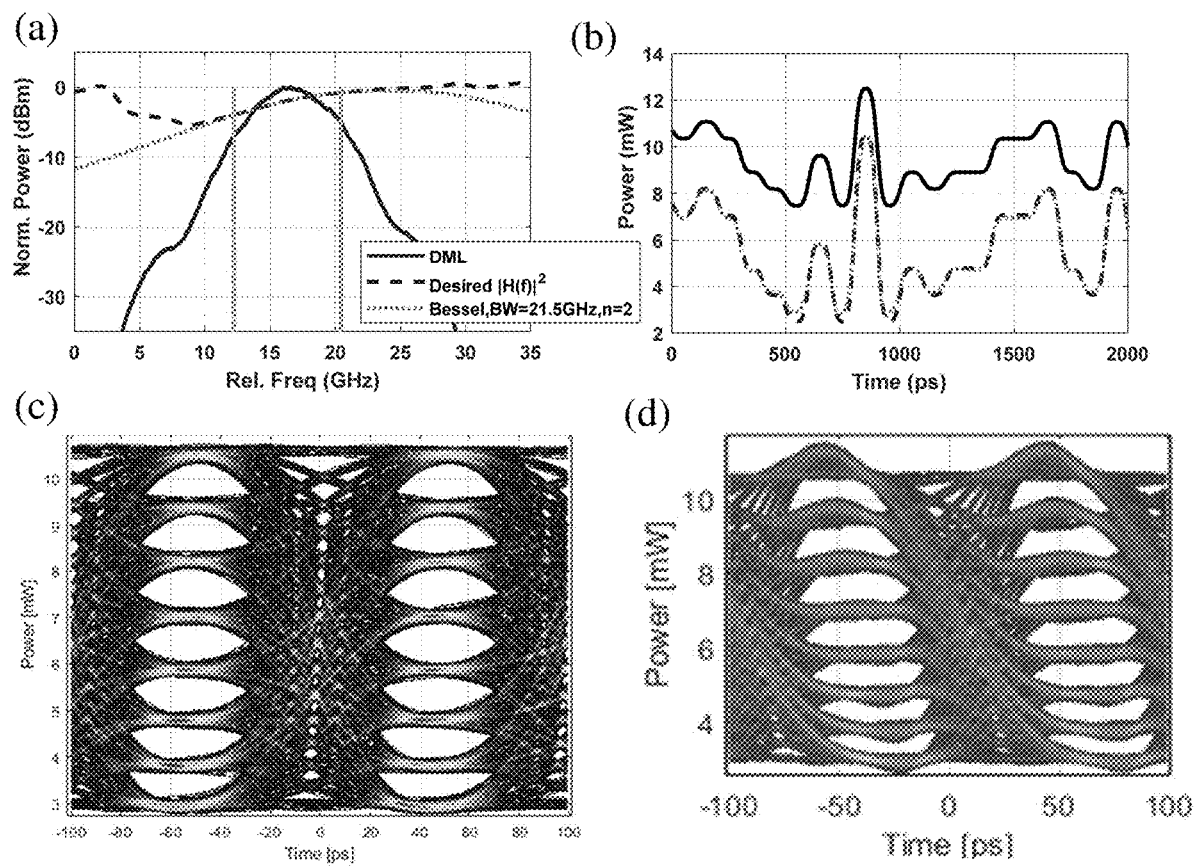
FIG. 22 shows an example of OMA vs. distance for a PAM8 signal.

FIG. 22 shows the performance of a filter developed using the inventive method for PAM8, with a target ER of 6.2 dB. FIG. 21(a) shows the PAM8 spectrum, the target filter and matched Bessel filter of second order with a BW of 21.5 GHz (fval–0.0.76) identified using the inventive method. FIG. 21(b) shows the temporal power of the DML with OMA=along with the target and obtained CML signals using the inventive filter. FIGS. 21(c)&(d) show the B2B and after 30 km fiber propagation at −8 dBm power.

One of skill in the art will appreciate from FIGS. 21 and 22, the temporal skew between PAM eyes after propagation is a significant challenge for multi-level signals. The ultimate skew may be approximately estimated using the OMA of the DML signal and optical fiber dispersion D may be given as $$\Delta T_{skew}=(\delta\lambda_{adb})LD \text{ and } \delta\lambda_{pp}=(\delta f_{adb})\lambda_0^2/c$$

where $\lambda_0$ is the wavelength of operation, D is dispersion coefficient and L is fiber transmission distance and $$\delta f_{adb} = \frac{\alpha}{4\pi}\kappa(OMA).$$

Figure 23:
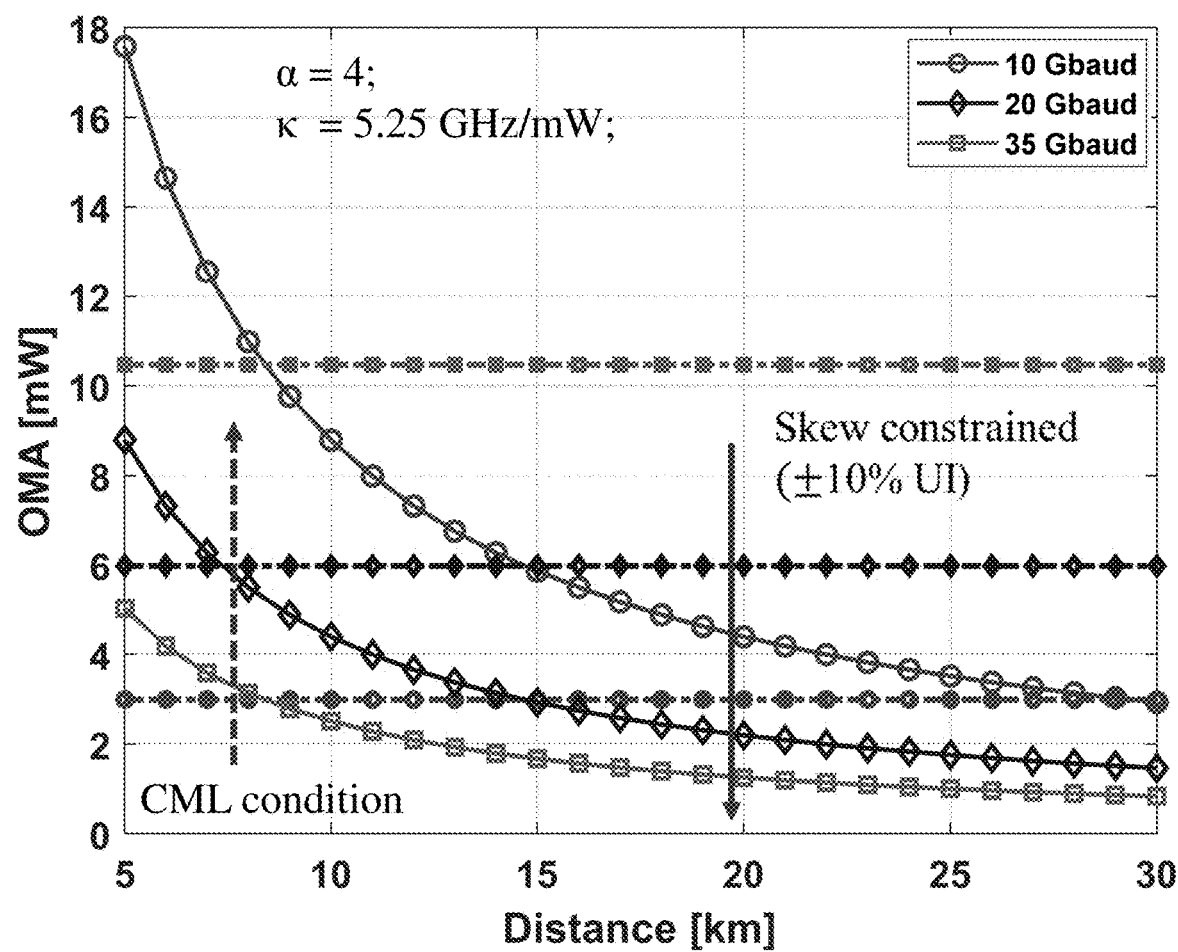
FIG. 23 shows the variation in BER with distance as a function of required OMA.

Therefore, an initial step in designing a CML filter may involve selecting an appropriate OMA. Assuming, ±10% UI from the middle eye or 20% UI between top and bottom eye (UI=unit interval=1/B) to be the maximum tolerable skew, FIG. 23 shows an example of OMA vs. distance to respect the CML condition ($\delta f_{adb}$=B/2) shown in dashed lines and the 20% UI skew constraint shown in solid lines.

Figure 24:
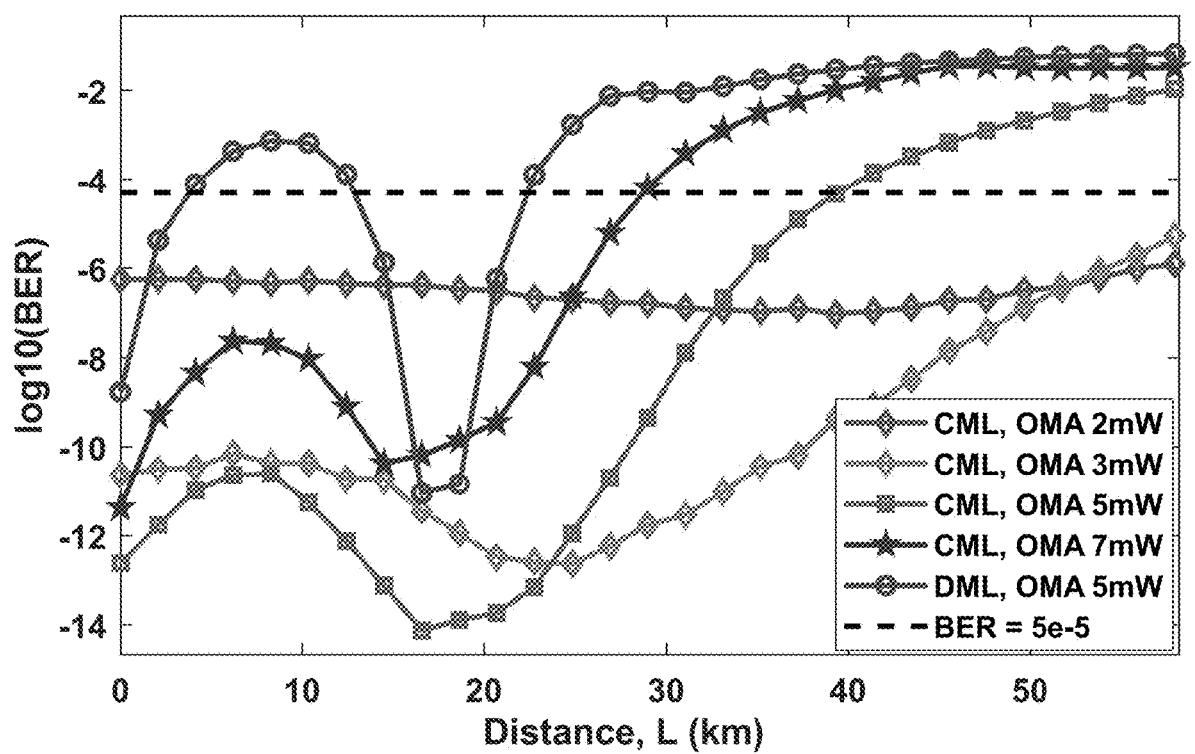
FIG. 24 shows the variation in BER with distance as a function of OMA for simulated transmission.

FIG. 24 shows the variation in BER with distance as a function of OMA for simulated transmission with an ER~6.2, where OMA=3 mW corresponds to the optimum condition, i.e., $\delta f_{adb}$=B/2. As shown in FIG. 23, lowering the OMA below the optimum condition may enable greater transmission distances with a lower BER, but to the detriment of BER performance at shorter distance. Slightly higher OMAs may improve BER performance of shorter distances only and higher OMAs tend to degrade performance over all distances.

Figure 25:
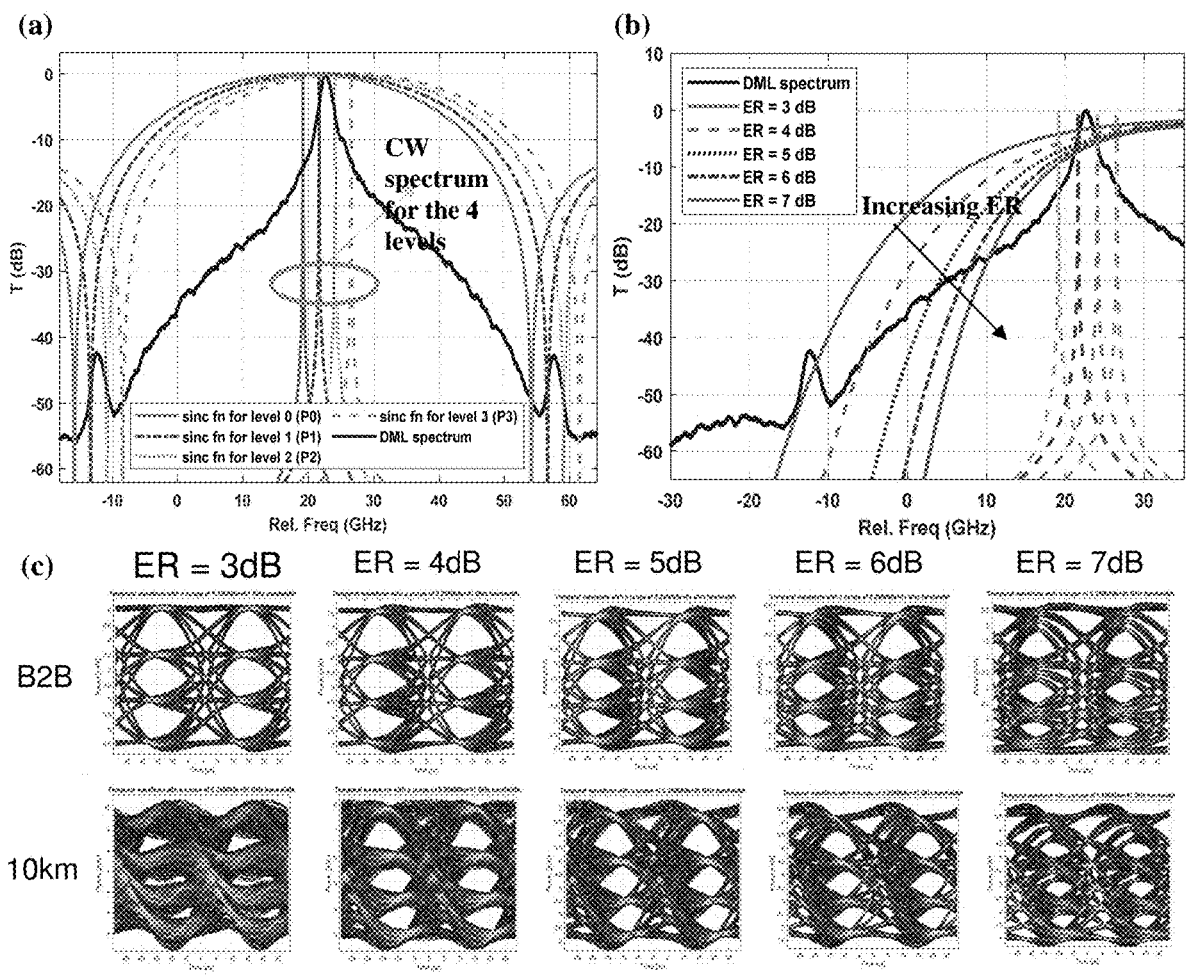
FIG. 25 shows (a) sinc and CW spectrum corresponding to the four levels of PAM4 signal, (b) DML spectrum and required fourth order Butterworth filters for different ERs, and (c) eye diagrams at B2B and after 10 km propagation with filters for different ER.

FIG. 25 shows (a) sinc and CW spectrum corresponding to the four levels of PAM4 signal (in this example, the DML output signal is a 35 Gbaud PAM4 with an ER of 1.4 dB), (b) DML spectrum and required fourth order SuperGaussian (SG) filters for different ERs, and (c) eye diagrams at B2B and after 10 km propagation with filters for different ER. As the baudrate increases, selecting the appropriate CML becomes challenging due to both temporal skew and signal inter-symbol interference (ISI) limitations. As mentioned above, the spectrum of a PAM4 DML signal can be described as a combination of four sinc functions, each centered around a different level of CW power spectrum, as illustrated in FIG. 25. To meet the skew requirements, selecting a smaller OMA leads to a concentration of higher power levels' spectra on the lower and higher side of the spectrum peak. The filter required to achieve a specific ER may lead to severe ISI at higher ERs. As a result, to minimize ISI, it may be necessary to limit the target ER. FIG. 25 (c) shows an example of the CML output (B2B) and after 10 km fiber propagation for five different ER values. For this example, the optimum eye after filtering occurs for the target ER of around 3-5 dB, which, considering 10 km fiber propagation, is 4-5 dB. With an ER of 3 dB, the filter's −20 dB point on the low-frequency side aligns with the −10 dB point of the sinc function for the P3 level, resulting in only a small ISI on the P3 level. As the ER increases, the filter's −20 dB point moves rightward, causing ISI to appear on the P3 for ER>3. Further increasing the ER attenuates more of the spectrum content, resulting in stronger ISI, degrading the eye. For this example, we use a SG and fixed the order (n=4) and specify the algorithm to find the appropriate BW, offset and gain. Therefore, for this example, it would be preferable to choose a filter design that, in addition to fulfilling the ER value, has a −20 dB point ($f_{CML,-20dB}$) around the −10 dB point ($f_{sinc,-10dB}$) of the sinc function for the P3 level on the lower frequency side to reduce ISI, i.e., $f_{CML,-20dB}=f_{sinc,-10dB}-\Delta f$ where $-\delta f_{adb}\leq\Delta f\leq\delta f_{adb}$. The skilled artisan may devise other customized/standard filters (with phase and/or amplitude) which satisfy the filter design described above and have less slope on the red spectrum side, or to use a MRR filter to avoid/reduce ISI.

Filters of the present invention may be implemented as one or more optical and/or electrical filters that provide the desired filter profile in the aggregate. As shown in FIGS. 4, 5, and 8A&B, the electrical filter (EF) may placed in the electrical circuit in the receiver. The optical filters may be placed in one or more locations in the optical circuit from the output of the DML to the input of the photodiode. FIG. 26 depicts three exemplary locations (a) in the transmitter, (b) in the receiver, and (c) in both the transmitter and receiver. Placing an optical filter near the transmitter is beneficial in that the filter reduces the signal spectrum before fiber transmission. If a system employs one or more optical amplifiers, e.g., EDFA, positioning one or more optical filters before the receiver and/or in the optical path following the optical amplifier(s) may be beneficial to filter the out of band amplified spontaneous emission (ASE) noise.

Figure 27:
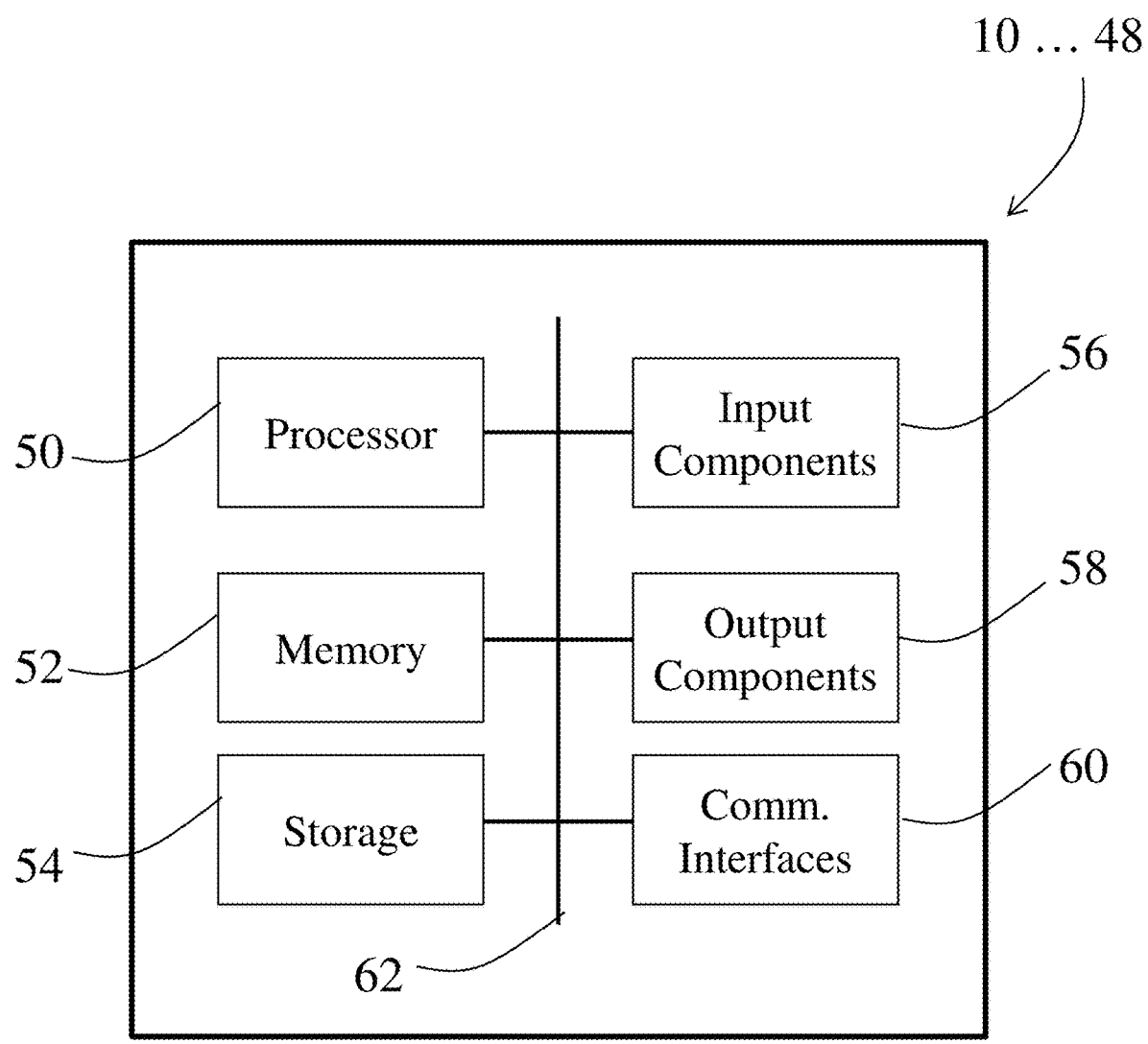
FIG. 27 illustrates exemplary component embodiments of various computing resources that may be employed in the system.

FIG. 27 illustrates exemplary component embodiments of various computing resources that may be employed in the system 10 and running various applications. The computing resources may include one or more processors 50, memory 52, storage 54, input components 56, output components 58, communication interfaces 60, as well as other components that may be interconnected as desired by the skilled artisan via one or more buses 62. As previously described, the components of the various computing resources may often be configured as a single device or multiple interdependent or stand-alone devices in close proximity and/or distributed over geographically remote areas.

Processor(s) 50 may include one or more general or Central Processing Units ("CPU"), Graphics Processing Units ("GPU"), Accelerated Processing Units ("APU"), microprocessors, and/or any processing components, such as a Field-Programmable Gate Arrays ("FPGA"), Application-Specific Integrated Circuits ("ASIC"), etc. that interpret and/or execute logical functions. The processors 50 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 50 may connect to other computer systems and/or to telecommunications networks as part of performing one or more steps of one or more processes described or illustrated herein, according to particular needs. This can be accomplished through APIs or other methods, using FHIR format or other health-specific format. Moreover, one or more steps of one or more processes described or illustrated herein may execute solely at the processor 50. In addition, or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 52 may include Random Access Memory ("RAM"), Read Only Memory ("ROM"), and/or another type of dynamic or static storage device, such as flash, magnetic, and optical memory, etc. that stores information and/or instructions for use by processor 50. The memory 52 may include one or more memory cards that may be loaded on a temporary or permanent basis. Memory 52 and storage 54 may include a Subscriber Identification Module ("SIM") card and reader.

Storage components 54 may store information, instructions, and/or software related to the operation of the system 10 and computing resources. Storage 54 may be used to store operating system, executables, data, applications, and the like, and may include fast access primary storage, as well as slower access secondary storage, which may be virtual or fixed. Storage 54 may include various types of memory 52.

Storage component(s) 54 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASIC, Compact Disks ("CDs"), Digital Video Disks ("DVDs", FPGAs, floppy disks, optical and magneto-optic disks, hard disks, holographic storage devices, magnetic tape, caches, Programmable Logic Devices ("PLDs"), RAM devices, ROM devices, semiconductor memory devices, solid state drives, cartridges, and other suitable computer-readable media.

Input components 56 and output components 58 may include various types of Input/Output ("I/O") devices. The I/O devices often may include a Graphical User Interface ("GUI") that provides an easy to use visual interface between the user and system 10 and access to the operating system or application(s) running on the devices.

Input components 56 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as biometrics, temperature & other environmental conditions, such as air quality, etc., location via Global Positioning System ("GPS") or otherwise, accelerometer, gyroscope, compass, actuator data, which may be input via a component in the system 10 and/or received via one or more communication interfaces 60.

Output component 58 may include displays, speakers, lights, sensor information, mechanical, or other electromagnetic output. Similar to the input, the output may be provided via one or more ports and/or one or more communication interfaces 60.

Communication interface 60 may include one or more transceivers, receivers, transmitters, modulators, demodulators that enable communication with other devices, via wired and/or wireless connections. Communication interface 60 may include Ethernet, optical, coaxial, Universal Serial Bus ("USB"), Infrared ("IR"), Radio Frequency ("RF") including the various Wi-Fi, WiMax, cellular, and Bluetooth protocols, such as Bluetooth, Bluetooth Low Energy (BLE), Wi-Fi (IEEE 802.11), Wi-Fi Direct, Super-WiFi, 802.15.4, WiMax, LTE systems, LTE Direct, past, current, and future cellular standard protocols, e.g., 4-5G, or other wireless signal protocols or technologies as described herein and known in the art.

Bus(es) 62 may connect a wide variety of other subsystems, in addition to those depicted, and may include various other components that permit communication among the components in the computing resources. The bus(es) 32 may encompass one or more digital signal lines serving a common function, where appropriate, and various structures including memory, peripheral, or local buses using a variety of bus architectures. As an example and not by way of limitation, such architectures include an Industry Standard Architecture ("ISA") bus, an Enhanced ISA ("EISA") bus, a Micro Channel Architecture ("MCA") bus, a Video Electronics Standards Association Local Bus ("VLB"), a Peripheral Component Interconnect ("PCI") bus, a PCI-eXtended ("PCI-X") bus, a Peripheral Component Interconnect Express (PCIe) bus, a Controller Area Network ("CAN") bus, and an Accelerated Graphics Port ("AGP") bus.

The computing resources of the system 10 may provide functionality as a result of the processors 50 executing software embodied in one or more computer-readable storage media residing in the memory 52 and/or storage 54 and logic implemented and executed in hardware. The results of executing the software and logic may be stored in the memory 52 and/or storage 54, provided to output components 58, and transmitted to other devices via communication interfaces which includes cloud storage and cloud computing. In execution, the processor 50 may use various inputs received from the input components 56 and/or the communications interfaces 60. The input may be provided directly to the processor 50 via the bus 62 and/or stored before being provided to the processor 50. Executing software may involve carrying out processes or steps may include defining data structures stored in memory 52 and modifying the data structures as directed by the software.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "at least one" or "one or more". Furthermore, as used herein, the term "set" is intended to include one or more items and may be used interchangeably with "at least one" or "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical transmission system comprising:
   an optical transmitter including a directly modulated laser ("DML") to transmit an input electrical signal carrying data as an optical signal carrying the data in at least two modulation levels;
   an optical receiver to receive the optical signal from the optical transmitter and convert the optical signal to an output electrical signal carrying the data;
   a filter configured to filter at least one of the input electrical signal, output electrical signal, and the optical signal to preferentially reduce the power in frequencies in lower modulation levels, where the filter is configured using a filter transfer function H(f), where $H(f) = E_{CML}(f)/E_{DML}(f)$ $E_{DML}$ (f) and $E_{CML}$ (f) being the optical Fourier transform fields of the DML and a chirped managed laser ("CML") implementation of the DML, respectively, and where $E_{DML}(f) =$ Fourier Transform$(FT)\{E_{DML}(t) = A_{DML}(t)e^{i\varphi_{DML}(t)}\}$ and $E_{CML}(f) = FT\{E_{CML}(t) = A_{CML}(t)e^{i\varphi_{DML}(t)}\}$ where A(t) is the amplitude and φ(t) is the phase of the optical field and $A_{CML}(t)$ is calculated using on a target Optical Modulation Amplitude ("OMA") and average power ("$Pavg_{CML}$") for the CML, and $\varphi_{CML}(t) = \varphi_{DML}(t)$.

2. The optical transmission system of claim 1, where
   the optical transmitter transmits the optical signal carrying data in a Pulse Amplitude Modulation 4 (PAM4) modulation format, the DML imparting frequency modulation to the optical signal such that the optical signal includes optical power in four PAM4 frequencies, f0, f1, f2, f3, proximate a center frequency, fc corresponding to PAM4 voltages Level 0, Level 1, Level 2, and Level 3; and
   the optical receiver includes
      an optical combiner to combine local oscillator light from a local oscillator at a local oscillator frequency, fLO with the optical signal carrying data to form a combined LO-optical signal; and
      an optical-electrical converter to downconvert the combined LO-optical signal to an electrical signal at an intermediate frequency equal to the difference between the center frequency and the local oscillator frequency and including electrical power in the four PAM4 frequencies proximate the intermediate frequency, f0, f1, f2, f3;
      the filter is an electrical filter to attenuate the electrical power in at least one of the PAM4 frequencies by a differing amount relative to the attenuation by the electrical filter of the electrical power in the other PAM4 frequencies to provide an attenuated electrical signal;

a rectifier to rectify the attenuated electrical signal; and
an output to output the data from the rectified electrical signal carrying data.

3. The system of claim 2, where
the electrical filter is configured to reduce the power in the Level 0 frequency more than in the Level 3 frequency.

4. The system of claim 2, where,
the electrical filter is configured to provide a percentage power reduction that is different for each PAM4 frequency level and where the percentage power reduction for Level 0>Level 1>Level 2>Level 3.

5. The system of claim 2, where
the rectifier is a squaring circuit followed by a low pass filter.

6. The system of claim 1, where
the filter is at least one of a trapezoidal, Gaussian, Super Gaussian, Bessel and Butterworth filter.

7. The system of claim 1, where
the filter includes at least one of low pass filter, a high pass filter, and a bandpass filter.

8. The system of claim 1, where,
the DML has laser parameters α and κ and configuring includes
calculating an $OMA_{DML}$ and $Pavg_{DML}$ for a modulation format and bit rate;
setting two of the CML output parameters, $OMA_{CML}$, $Pavg_{CML}$, and extinction ratio ($ER_{CML}$) to a desired values;
calculating $E_{CML}$ (t) using the set values for $OMA_{CML}$, $Pavg_{CML}$, and extinction ratio ($ER_{CML}$);
calculating the filter transfer function H(f) using the calculated value of $E_{CML}$ (t);
identify at least one filter shape that fits the transfer function over a frequency range of interest;
filtering at least one of the input electrical signal, output electrical signal, and optical signal the filter having the at least one identified filter shape.

9. The system of claim 1, where,
the filter is an optical filter positioned to receive as input the output of the DML.

10. A method of transmitting data in an optical transmission system comprising:
transmitting, via an optical transmitter including a directly modulated laser ("DML"), an input electrical signal carrying data as an optical signal carrying the data in at least two modulation levels;
receiving, via an optical receiver, the optical signal from the optical transmitter and convert the optical signal to an output electrical signal carrying the data; and
filtering, via a filter, at least one of the input electrical signal, output electrical signal, and the optical signal carrying the data to preferentially reduce the power in frequencies in lower modulation levels, where the filter is configured using a filter transfer function H(f), where $H(f)=E_{CML}(f)/E_{DML}(f)$ $E_{DML}$ (f) and $E_{CML}$ (f) being the optical Fourier transform fields of the DML and a chirped managed laser ("CML") implementation of the DML, respectively, and where $E_{DML}(f)=$Fourier Transform$(FT)\{E_{DML}(t)=A_{DML}(t)e^{i\varphi DML(t)}\}$ and $E_{CML}(f)=FT\{E_{CML}(t)=A_{CML}(t)e^{i\varphi DML(t)}\}$ where A(t) is the amplitude and φ(t) is the phase of the optical field and $A_{CML}$ (t) is calculated using on a target Optical Modulation Amplitude ("OMA") and average power ("$Pavg_{CML}$") for the CML, and $\varphi_{CML}(t)=\varphi_{DML}(t)$.

11. The method of transmitting data of claim 10, where
transmitting includes transmitting the optical signal carrying data in a Pulse Amplitude Modulation 4 (PAM4) modulation format, the DML imparting frequency modulation to the optical signal such that the optical signal includes optical power in four PAM4 frequencies, $f_0$, f1, f2, f3, proximate a center frequency, fc corresponding to PAM4 voltages Level 0, Level 1, Level 2, and Level 3; and
receiving includes
combining, via an optical combiner, local oscillator light from a local oscillator at a local oscillator frequency, $f_{LO}$, with the optical data signal to form a combined LO-optical signal;
downconverting, via an optical-electrical converter, the combined LO-optical signal to an electrical signal at an intermediate frequency equal to the difference between the center frequency and the local oscillator frequency and including electrical power in the four PAM4 frequencies proximate the intermediate frequency, $f_0$, f1, f2, f3;
attenuating, via an electrical filter, the electrical power in at least one of the PAM4 frequencies by a differing amount relative to the attenuation by the electrical filter of the electrical power in the other PAM4 frequencies to provide an attenuated electrical signal;
rectifying, via a rectifier, the attenuated electrical signal; and
outputting the data from the rectified electrical signal.

12. The method of transmitting data of claim 11, further comprising
calculating, via at least one processor, a bit error rate ("BER") of the optical signal based on the attenuated electrical signal; and
varying, via at least one of the processors, the local oscillator frequency to vary the attenuation of the electrical power in the four PAM4 frequencies to reduce the BER to at least a target BER.

13. The method of transmitting data of claim 11, where the optical receiver is a quasi-coherent optical receiver.

14. The method of transmitting data of claim 10, further comprising
transmitting, via the optical transmitter, a continuous wave (CW) signal at a first frequency $f_1$ have a first power $P_1$;
providing, via the local oscillator source, local oscillator light at a local oscillator frequency $f_{LO}$;
combining, via a combiner, the local oscillator light with the CW signal at the first frequency $f_1$;
downconverting, via optical to electrical converter, the combined signal to a first electrical signal at an intermediate frequency, $f_{IF}$;
measuring, via voltage monitor, power of the first electrical signal;
varying the local oscillator frequency $f_{LO}$ over a first frequency range;
identifying a first local oscillator frequency $f_{LO}$ at which a maximum power of the first electrical signal was measured, $f_{LO,1}$;
transmitting, via the optical transmitter, a CW signal at a second frequency $f_0$ have a second power $P_0$;
combining, via a combiner, the local oscillator light with the CW signal at the second frequency $f_0$;

downconverting, via optical to electrical converter, the combined signal to a second electrical signal at the intermediate frequency, $f_{IF}$;

measuring, via voltage monitor, power of the second electrical signal;

varying the local oscillator frequency $f_{LO}$ over a second frequency range;

identifying a second local oscillator frequency $f_{LO}$ at which a maximum power of the second electrical signal was measured, $f_{LO,0}$;

calculating, via at least one processor, adiabatic chirp frequency difference $f_{ad(1-0)}$, where $f_{ad(1-0)} = f_{LO,1} - f_{LO,0}$;

calculating, via the at least one processor, optical modulation amplitude (OMA) and extinction ratio (ER), where $OMA = P_1 - P_0$, and $ER = P_1/P_0$;

calculating, via the at least one processor, a laser parameter Lp for the optical transmitter (ER), where $Lp = \alpha\kappa = (4\pi f_{ad(1-0)})/OMA$, where α is the linewidth enhancement factor, and
κ is adiabatic chirp constant;

varying, via the at least one processor, the ER of the optical transmitter when the OMA is outside of a target OMA range.

15. The method of transmitting data of claim 14 where the target OMA range is +/−10% of the target OMA.

16. The method of transmitting data of claim 10, further comprising:

splitting, via a first splitter, a first electrical signal portion from one of the input and output electrical signal;

filtering, via a low pass filter having a F3 dB bandwidth, the first electrical signal portion to provide a filtered signal portion;

amplifying, via an amplifier having a gain coefficient (a), the filtered signal portion to produce an amplified filtered signal portion;

combining, via a combiner, amplified filtered signal portion with the signal to provide a resultant signal;

splitting, via a second splitter, a second electrical signal portion from the resultant signal;

determining the peak-to-peak voltage ($V_{pp}$) of the second electrical signal portion;

comparing the determined $V_{pp}$ of the second electrical signal portion signal with a target $V_{pp}$;

varying at least one of the low pass filter F3 dB bandwidth and the gain coefficient (a) when the determined $V_{pp}$ is greater than the target $V_{pp}$.

17. The method of transmitting data of claim 16, where the splitting of the first and second electrical signals is performed at an optical receiver.

18. The method of transmitting data of claim 16, where the target $V_{pp}$ is set to the determined $V_{pp}$ when the determined $V_{pp}$ is lower than the target $V_{pp}$.

19. An optical transmission system comprising:

an optical transmitter including a directly modulated laser (DML) to transmit an optical data signal carrying data in a Pulse Amplitude Modulation 4 (PAM4) modulation format, the DML imparting frequency modulation to the optical signal such that the optical signal includes optical power in four PAM4 frequencies, $f_0$, $f_1$, $f_2$, $f_3$, proximate a center frequency, fc corresponding to PAM4 voltages Level 0, Level 1, Level 2, and Level 3;

an optical receiver to receive the optical data signal, where the optical receiver includes an optical combiner to combine local oscillator light from a local oscillator at a local oscillator frequency, $f_{LO}$ with the optical data signal to form a combined LO-optical signal;

an optical-electrical converter to downconvert the combined LO-optical signal to an electrical signal at an intermediate frequency equal to the difference between the center frequency and the local oscillator frequency and including electrical power in the four PAM4 frequencies proximate the intermediate frequency, $f_0$, $f_1$, $f_2$, $f_3$;

an electrical filter to attenuate the electrical power in at least one of the PAM4 frequencies by a differing amount relative to the attenuation by the electrical filter of the electrical power in the other PAM4 frequencies to provide an attenuated electrical signal;

a rectifier to rectify the attenuated electrical signal; and an output to output the data from the rectified electrical signal.

20. The optical transmission system of claim 19, where the filter configured to filter at least one of the input electrical signal, output electrical signal, and the optical signal to preferentially reduce the power in frequencies in lower modulation levels, where the filter is configured using a filter transfer function H(f), where $H(f) = E_{CML}(f)/E_{DML}(f)$ $E_{DML}(f)$ and $E_{CML}(f)$ being the optical Fourier transform fields of the DML and a chirped managed laser ("CML") implementation of the DML, respectively, and where $E_{DML}(f) = \text{Fourier Transform}(FT)\{E_{DML}(t) = A_{DML}(t)e^{i\varphi_{DML}(t)}\}$ and $E_{CML}(f) = FT\{E_{CML}(t) = A_{CML}(t)e^{i\varphi_{DML}(t)}\}$ where A(t) is the amplitude and φ(t) is the phase of the optical field and $A_{CML}(t)$ is calculated using on a target Optical Modulation Amplitude ("OMA") and average power ("$Pavg_{CML}$") for the CML, and $\varphi_{CML}(t) = \varphi_{DML}(t)$.

* * * * *